Dec. 28, 1965 L. O. BERGMAN 3,226,407
PROCESS FOR ACID AND THEN ALKALINE REFINING FATTY OILS
Filed Oct. 22, 1962 10 Sheets-Sheet 1
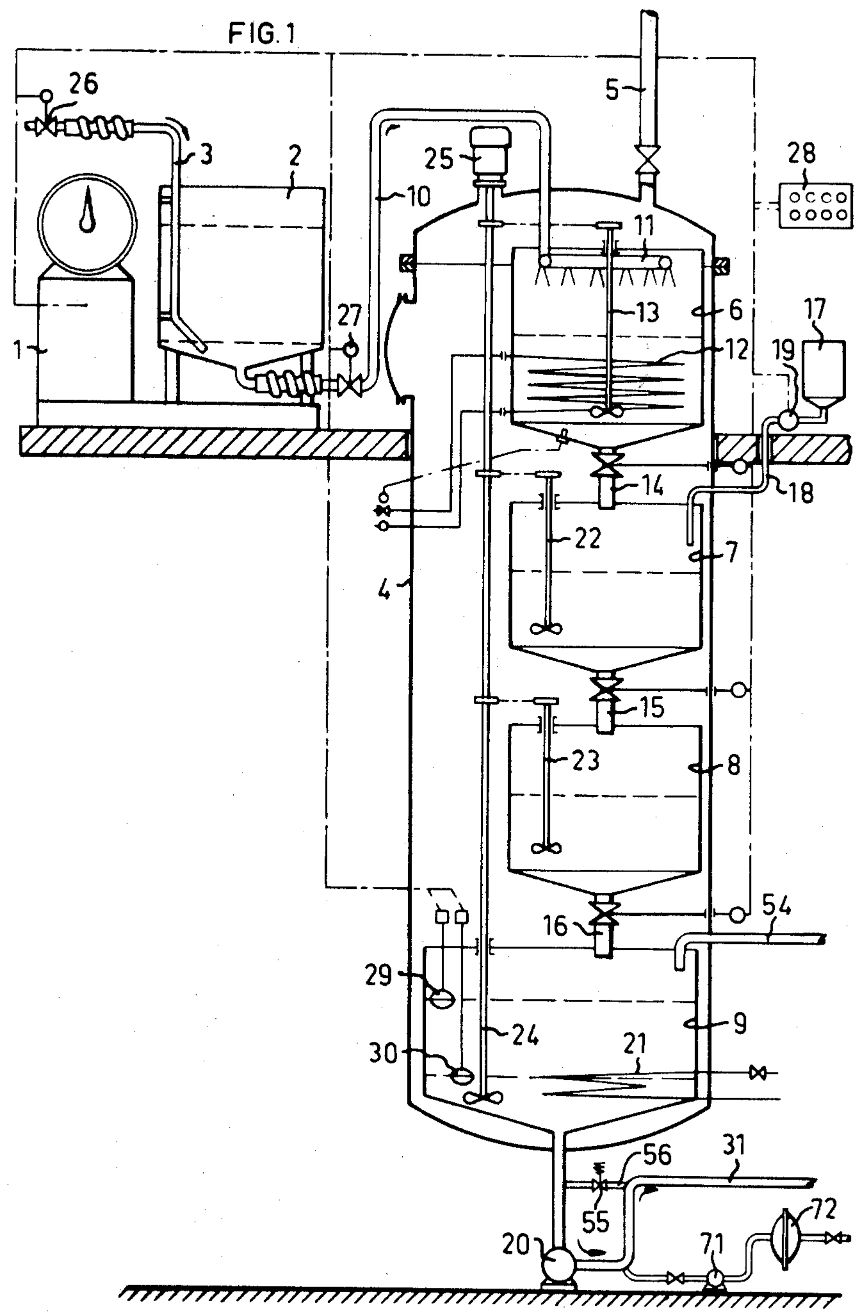
Lars Olof Bergman,
Inventor
By Wenderoth, Lind & Ponack,
Attorneys

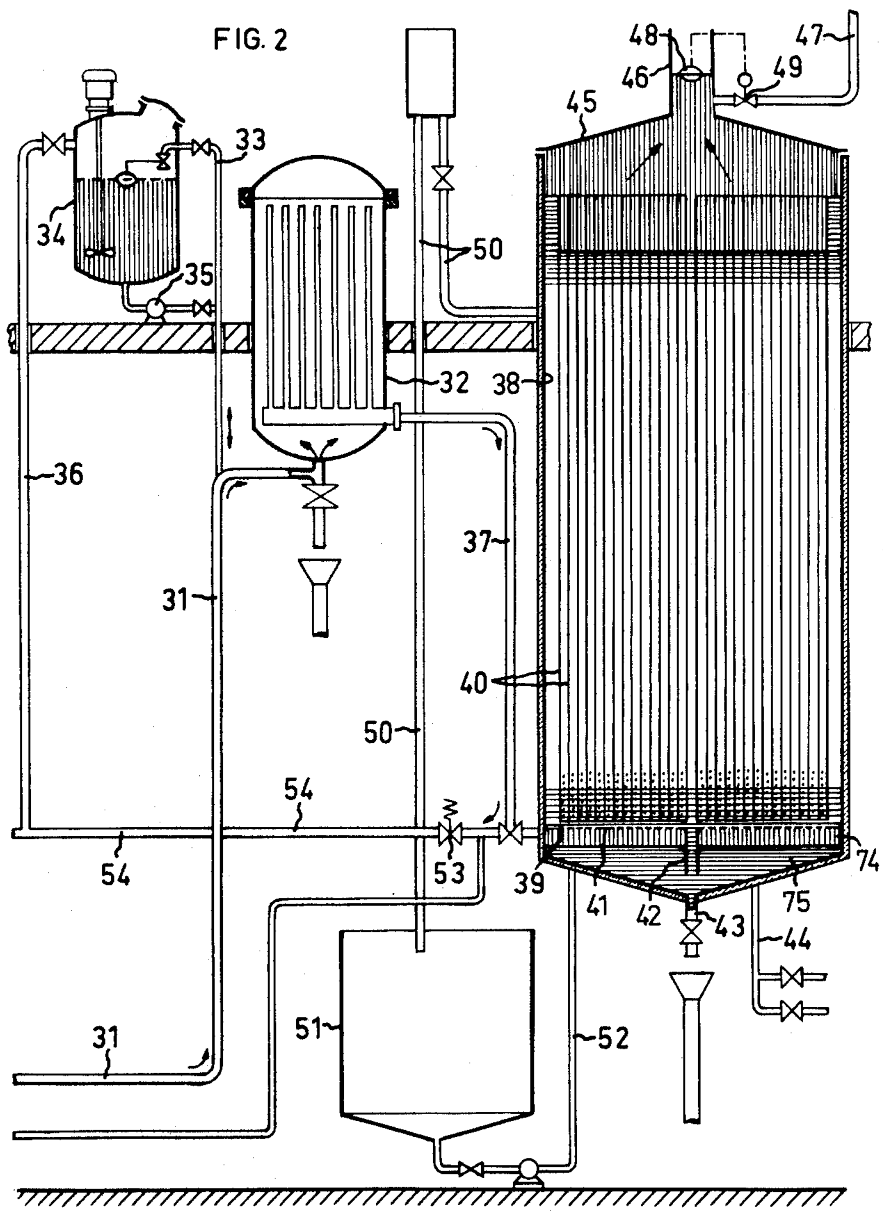
Lars Olof Bergman,
Inventor
By Wenderoth, Lind and Ponack,
Attorneys

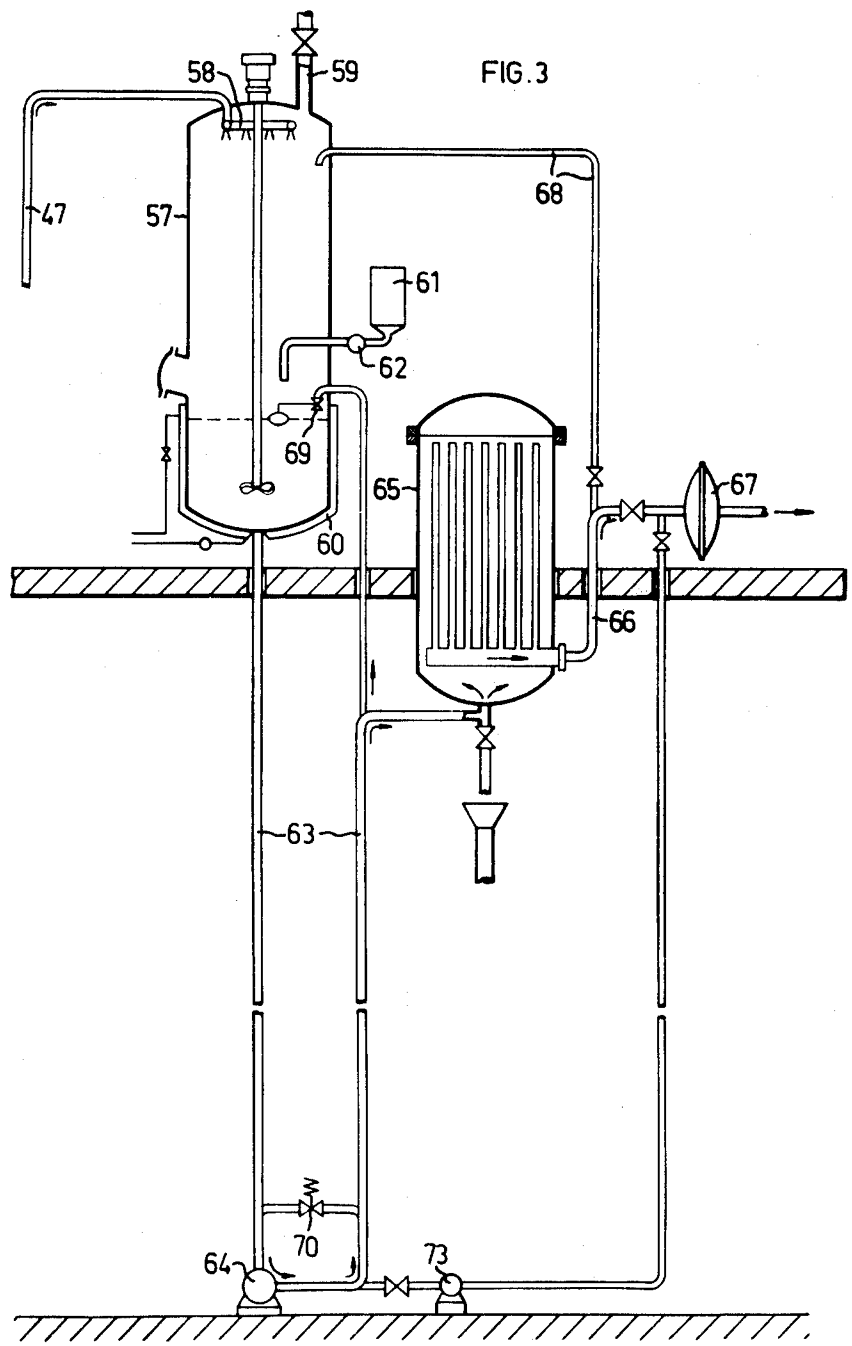
Lars Olof Bergman
Inventor
By Wenderoth, Lind and Ponack
attorneys

Dec. 28, 1965 L. O. BERGMAN 3,226,407
PROCESS FOR ACID AND THEN ALKALINE REFINING FATTY OILS
Filed Oct. 22, 1962 10 Sheets-Sheet 4
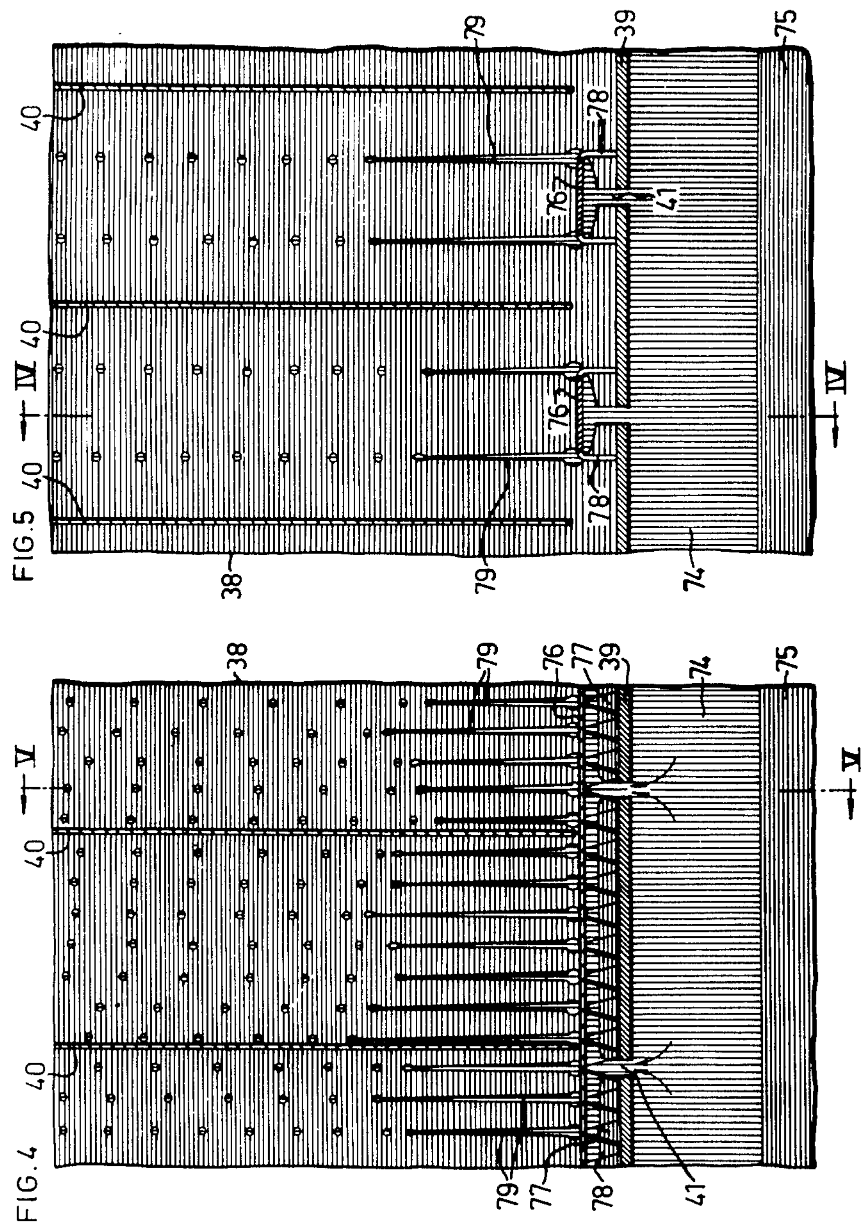
Lars Olof Bergman,
Inventor
By Wenderoth, Lind and Ponack,
attorneys

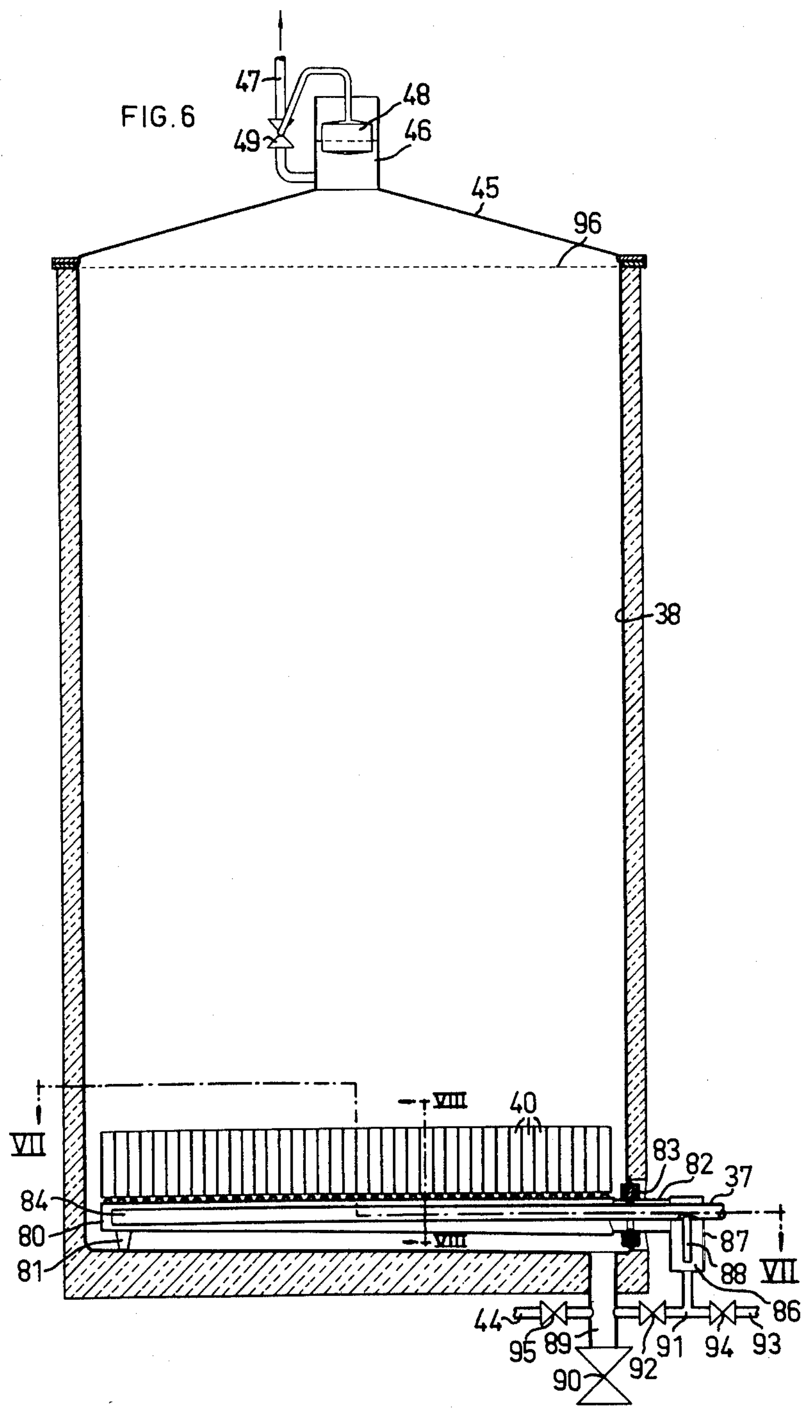
Lars Olof Bergman
Inventor
By Wenderoth, Lind and Ponack
Attorneys

Dec. 28, 1965 L. O. BERGMAN 3,226,407

PROCESS FOR ACID AND THEN ALKALINE REFINING FATTY OILS

Filed Oct. 22, 1962 10 Sheets-Sheet 6

Lars Olof Bergman
Inventor

By Wenderoth, Lind and Ponack
Attorneys

PROCESS FOR ACID AND THEN ALKALINE REFINING FATTY OILS
Filed Oct. 22, 1962
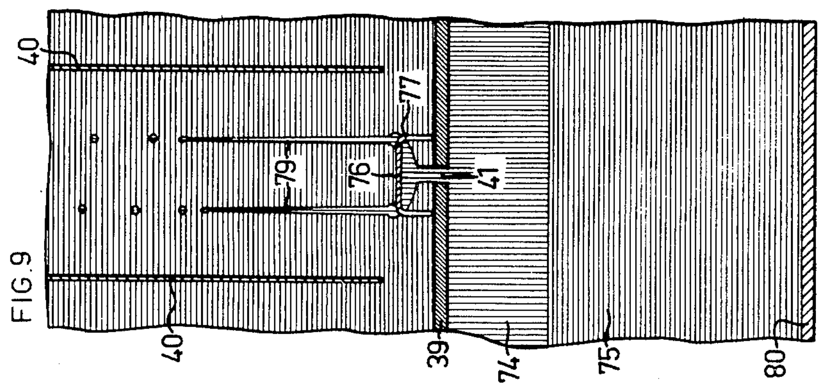
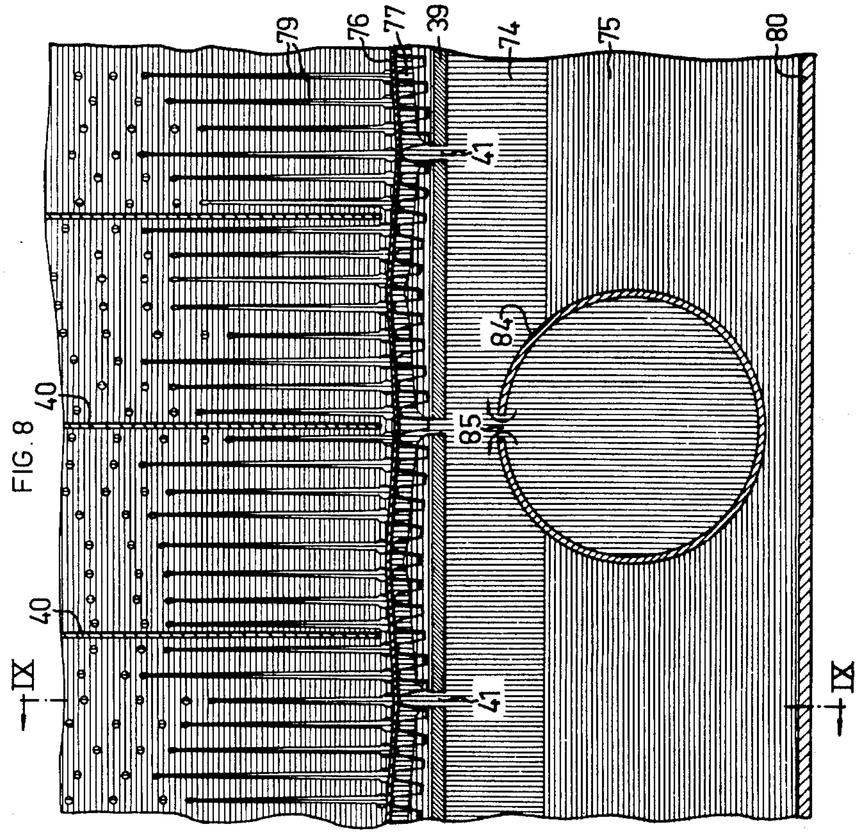
Lars Olof Bergman
Inventor
By Wenderoth, Lind and Ponack
Attorneys

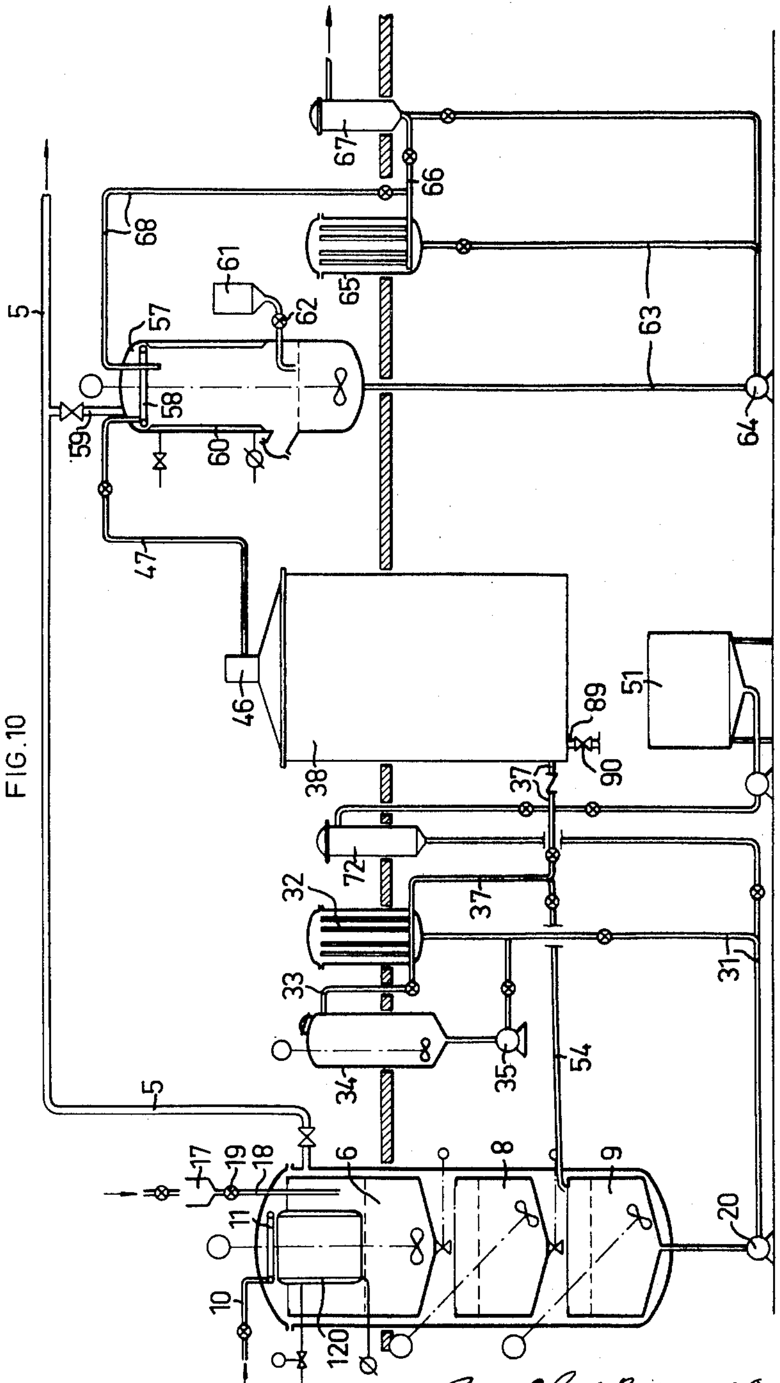
Lars Olof Bergman
Inventor
By Wenderoth, Lind and Ponack
Attorneys

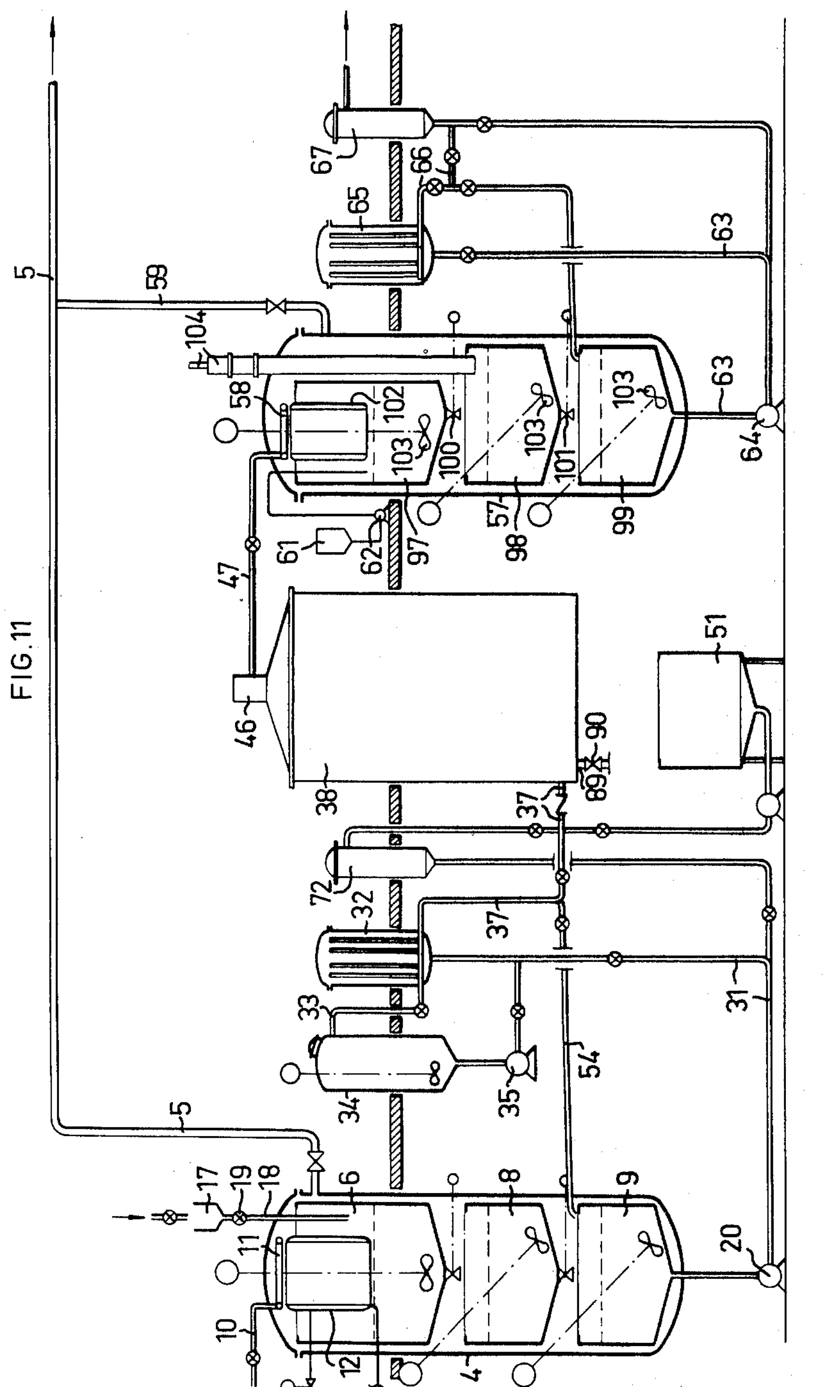
Lars Olof Bergman
Inventor
By Wenderoth, Lind and Ponack,
Attorneys

PROCESS FOR ACID AND THEN ALKALINE REFINING FATTY OILS
Filed Oct. 22, 1962
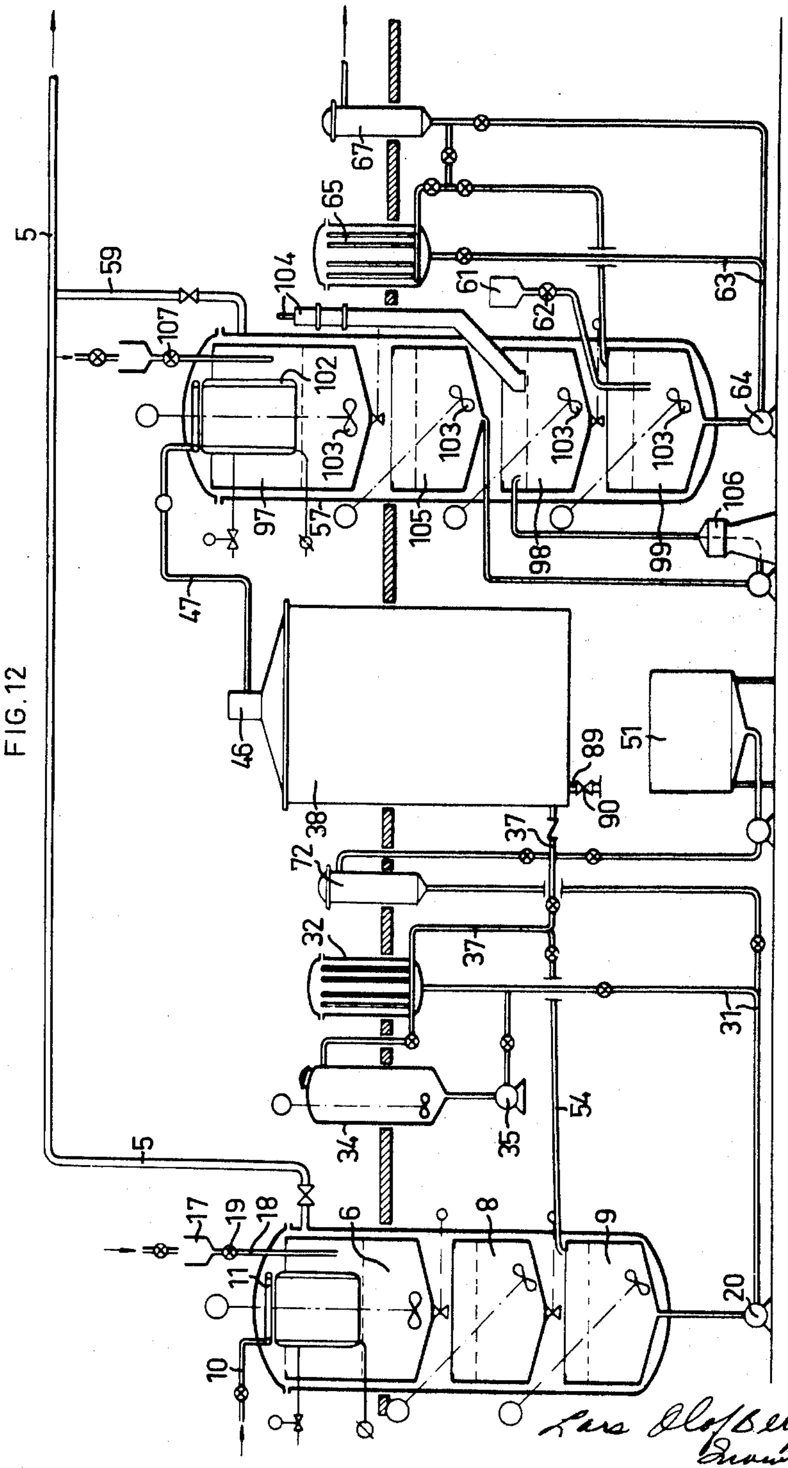
Lars Olof Bergman
Inventor
By Wenderoth, Lind and Ponack, Attorneys United States Patent Office 3,226,407

Patented Dec. 28, 1965

3,226,407

PROCESS FOR ACID AND THEN ALKALINE REFINING FATTY OILS

Lars Olof Bergman, Sallerupsvägen 11, Malmo C, Sweden

Filed Oct. 22, 1962, Ser. No. 232,146
14 Claims. (Cl. 260—424)

This application is a continuation-in-part of my application Serial No. 841,058, now abandoned, and Serial No. 75,230, now abandoned, a continuation-in-part of Serial No. 841,056, now abandoned. Serial No. 841,056 and Serial No. 841,058 were filed on September 21, 1959. Serial No. 75,230 was filed on December 12, 1960.

This invention relates to a process and a plant for industrial refining of vegetable and animal fatty oils and other fats for edible purposes.

Most crude vegetable and animal fatty oils and other fats, whether obtained by pressing, solvent extraction or rendering, are given a preliminary cleaning and clarification treatment. When required for edible purposes they are nearly always given a series of further treatments, which comprises a pre-treatment consisting of or including degumming, usually by means of acid, and then neutralization by means of caustic soda solution or other alkaline aqueous solution, bleaching, usually in the form of adsorption bleaching, and deodorization. These treatments are all known in many variations. Heating to about or above 100° C. in or prior to degumming and neutralization is known to be detrimental to all such fats as are used industrially for the manufacture of such edible products as margarine. In degumming by acid it has been proposed to given preference to phosphoric acid ($H_3PO_4$) over other strong mineral acids such as sulphuric acid and hydrochloric acid.

In this application the term "refining" is applied, as is usual in the United States of America, to the operations of pre-treatment and neutralization and thus not, as is usual in most other countries, to the complete series of treatments, including bleaching and deodorization, to make the fat suitable for edible use. Consequently my invention, in accordance with the title thereof, is concerned with the operations of pre-treatment and neutralization and especially with the neutralization operation, in that the chief object of my invention is to teach a new continuous method and devise new apparatus for contacting the fat with caustic soda solution or other alkaline aqueous solution by bubbling the fat up through a column of such solution for converting free fatty acids in the fat into soaps dissolving in the aqueous solution, thereby forming a by-product known as soapstock, and in that a further object of my invention is to combine with this new continuous neutralizing method a new semi-continuous method of pre-treating the fat with orthophosphoric acid to improve the decolorizing and other purifying effects of the refining process so that, depending on the nature and quality of the crude fat, the conventionally required bleaching of the refined fat with bleaching earth or other adsorption bleaching agent such as active carbon to render the fat satisfactory for the manufacture of edible products such as margarine, can be entirely dispensed with or can be carried out with a much smaller amount of bleaching agent.

One economically important problem in connection with the refining of fats for edible purposes is to keep the refining loss of neutral fat, which cannot be entirely avoided, as low as possible. As is well known, emulsion formation and over-saponification are the chief sources of loss of neutral fat with the by-product, the soapstock, in wet neutralization of fats by means of alkali. One object of my invention is to eliminate or minimize the loss of neutral fat with the by-product, the soapstock, of the neutralization operation.

Another object of my invention is to eliminate the need of the conventionally required relatively costly washing of the neutralized fat with hot water and/or dilute aqueos solutions of suitable chemicals such as common salt and soda ash for a substantially complete removal of soap and alkali residues in the neutralized fat after the separation thereof from the spent lye (the soapstock). The elimination of washing of the neutralized fat automatically eliminates the otherwise unavoidable loss of some neutral fat with used washing media.

The removal of soap and alkali residues in fat after lye neutralization of the fat and separation of the neutralized fat from the used lye (the soapstock) is so cosely connected with the operation of neutralizing the fat that this removal practically can be considered a finishing step of this operation. A still further object of my invention is to carry out this finishing step of the refining of the fat by a comparatively cheap treatment of the fat, in combination with vacuum drying of the fat, with an aqueous solution of an acid selected from the large group of acids which in accordance with common chemical knowledge have a dissociation constant higher than that of the fatty acids of the fat, and which with such alkali as is used in the neutralization operation of the fat refining process form a salt that is soluble in water and insoluble in fat, so that the selected acid in accordance with the well known mechanism splits the soap residue in the fat into free fatty acids dissolving in the fat, and alkali, and so that the salt which the acid forms with the alkali in the fat, is precipitated in solid form in the fat by the vacuum drying thereof and can be removed by filtering. For already known reasons preference is given to citric acid over other acids which like citric acid belong to the above defined large group of acids. A still further object of my invention is to combine this treatment of the neutralized fat for removing soap and alkali residues therein with the conventional adsorption bleaching, if any, and with the conventional vacuum drying and filtering of the refined fat prior to the deordorization which is the last treatment in the series of treatments which the fat must be given to make it suitable for the manufacture of edible products such as margarine.

When ready for the last treatment, the deodorization, the fat must be free from soap residue. A small free fatty acid content is much more tolerable than a small soap residue in the fat when ready for the manufacture of edible products such as margarine. Even traces of soap in the fat can unfavourably affect the taste of flavor of the fat and the edible products produced therefrom. In known and most applied practice the conventionally required adsorption bleaching is relied on for completing the removal of the soap residue in the neutralized fat, for which purpose the bleaching earth or other adsorption bleaching agent must be used in a greater amount than otherwise would be necessary. The elimination by my invention of the need of the conventionally required adsorption bleaching of the neutralized fat, or the reduction of the amount of bleaching agent required for the bleaching, if any, eliminates, or reduces, such loss of neutral fat as is caused by retention of fat in any used adsorption bleaching agent. It is true that fat in spent bleaching earth as well as in spent filter aid can be recovered, but such recovering is costly and invariably yields fat of poor quality, so that most refineries discard their spent bleaching earth and spent filter aid without treatment.

Because the boiling point of the free fatty acids is lower than that of the fat, the deodorization, which is a high temperature treatment, may serve also the purpose of lowering a somewhat too large content of free fatty acids in the fact so as to render the fat satisfactory for edible use. Therefore, as is well known, the neutralization operation, including the above-mentioned vacuum drying, need not necessarily be carried to a complete removal of the free fatty acids in the fact. It is known that in some carefully prepared fats (such as lard and certain low-temperature produced vegetable oils from selected fruit and seed) a lowering of the content of free fatty acids to a small percentage, about 0.5 percent or less, depending on the nature of the fat and the free fatty acids therein, may be satisfactory. However, in all such fats as are used industrially for the manufacture of such edible products as margarine and require refining, a thorough elimination of free fatty acids is necessary or desirable and also helps to reduce the cost of removing other undesirable constituents.

Both from the point of view of cost and of efficiency caustic soda is nearly the only alkali used in industrial neutralization of fats for edible purposes. Though not intended to alter this practice my invention is not limited to using caustic soda solution for the neutralization operation. The new continuous method of my invention for carrying out the neutralization operation is applicable also with other alkaline aqueous solutions. For example, caustic potash solution may be used where desired for the reason that the potassium soaps are more readily soluble than the sodium soaps. Also alkali carbonate and ammonium hydroxide solutions may be used. The new continuous method of my invention for carrying out wet neutralization of fats (also such a blend of a fat and a solvent therefor as is called a miscella) by means of alkali can be used not only for thorough neutralization but also for part-neutralization if so desired for one reason or the other.

The extent to which a fat should be decolored is a question of its future use. The invention is concerned chiefly with the refining of fats for the manufacture of such edible products as margarine which usually have to be artificially colored with reddish to yellowish coloring matter, often of carotene character. For this reason there is, as a rule, no need of a thorough elimination of coloring matter of this character by the decolorizing effect of the refining process of my invention in any form thereof including my new semi-continuous method of carrying out the pre-treatment of the fat with orthophosphoric acid and my new continuous method of carrying out the alkali neutralization of the fat by bubbling it up through a caustic solution column. The refining process of my invention in such a form thereof has proved to be highly selective in its effect of removing coloring matter in the fat and removes undesirable greenish coloring matter, which chiefly is of chlorophyll character, much more completely than reddish to yellowish coloring matter which chiefly is of carotene character and does not interfere with the aim of the artificial color which the edible products are to be given.

All such crude fats as are taken into refineries for processing contain moisture. In already proposed degumming by phosphoric acid the moisture in the fat has been found to make fitlering of the acid-treated fat for the removal of formed sludge prior to following lye neutralization of the fat slow and different. It has been suggested and tried, though without much success, to overcome this difficulty by performing the treatment of the fat with phosphoric acid in the presence of an absorbent substance such as cellulose. Phosphoric acid is miscible with water in all proportions, and the presence of an absorbent substance such as cellulose in a fat at a pre-treatment thereof with phosphoric acid does not inhibit dilution of the phosphoric acid by water in the fat. The use of an absorbent substance such as cellulose involves loss of some neutral fat with the spent absorbent substance.

The basic point of novelty of my new semi-continuous method of carrying out the pre-treatment of the fat with phosphoric acid ($H_3PO_4$) prior to the lye neutralization of the fat by my new continuous method of bubbling the fat up through a lye column as described below, consists in contacting the phosphoric acid with the fat by stirring at an elevated temperature in the range about 60 to about 90° C., preferably in the range about 75 to about 85° C., in substantially complete absence of water and atmospheric oxygen for a period of at least 5 minutes and preferably in the range about 15 to about 30 minutes, since the desirable reactions which at said elevated temperature and substantially complete absence of water and atmospheric oxygen take place between the phosphoric acid and coloring matter, phosphatides and other undesirable natural constituents or decomposition products such as oxidation products held in solution or colloidal suspension in the fat, have been found to be slow. The required degree of absence of water and atmospheric oxygen at the contacting of the phosphoric acid with the fat is such as is practically obtainable only by vacuum drying the fat by evacuation to an absolute pressure below 60 and preferably about 20 mm. of mercury and holding the fat under this vacuum in the reaction zone. For minimizing the addition of water to the fat together with the phosphoric acid the latter should be of a high concentration, preferably as high as 85 percent by weight, at the addition thereof to the fat, and dilution of the added phosphoric acid by water in the fat should be avoided by thoroughly removing the water in the fat by the vacuum drying thereof before the phosphoric acid is added to the fat. Since the phosphoric acid is used in a small amount already a small amount of water in the fat is sufficient for a considerable dilution of the phosphoric acid. When using an 85% phosphoric acid the required amount thereof varies in the range 0.025 to 0.6 or in exceptional cases up to about 1 percent by weight of the fat with the content of such undesirable constituents and impurities in the fat as are removable by the above described degumming by phosphoric acid. With a given fat to be refined the suitable amount of phosphoric acid to be used can be determined or estimated by the guidance of conventionally required analyses of the fat and laboratory tests for refining and decoloring efficiency. Filtration of the fat for a thorough removal of formed precipitates or sludge prior to the neutralization operation should be performed in the phosphoric-acid-treated and vacuum-dried state of the fat without admittance of air. Under these conditions the filtration can be carried out without difficulties through a filter given a pre-coat of a suitable filter aid such as kieselguhr. This filtration also decreases the amount of residual phosphoric acid in the degummed fat. A clarification of the phosphoric-acid-treated fat by centrifugation prior to the filtration can be performed for speeding up the filtration and for reducing the required amount of filter aid and thereby also the loss of neutral fat with spent filter aid.

In connection with my new continuous method of carrying out neutralization of degummed fats by bubbling the fat up through a column of caustic soda solution or other alkaline aqueous solution capable of being used for industrial alkali wet neutralization of fats, I use in this specification for convenience the term "lye", unless otherwise specified, to cover any such alkaline aqueous solution. Lye-treatment of fats for neutralization purposes is nearly always performed at an elevated temperature in the range about 60 to about 90° C., and this applies also to the continuous neutralization method of my invention.

For carrying out neutralization of degummed fats by my new continuous method of bubbling the fat up through a column of lye on an industrial scale this liquid column must have throughout its height a horizontal cross sectional area of at least about 1 sq. m. and preferably not less than about 2 sq. m., so that the apparatus, called the neutralizer, required for practising this method must comprise a large stationary receptacle properly describable as a standing tank for holding this liquid column. The feed of the fat to the lye column at the base thereof must be subdivided into thousands, preferably about ten thousands per sq. m. of the horizontal cross sectional area of the lye column, substantially equal separate streams of such a regulated rate of flow and moderate initial velocity that they on flowing into the lye column are caused by their buoyancy in the lye to rise therein like substantially vertically projecting footstalks and to keep on breaking up at their tops into drops of substantially equal size in the range 0.3 to 3 mm., preferably about 1.5 mm., which drops ascend in interspaced relation substantially their shortest ways substantially vertically up through the lye column, provided that this desired course of the bubbling up of the fat through the lye column is not spoiled by turbulent or like motion of the lye. On flowing into the lye column and breaking up into separate drops the large number of fat streams have a marked tendency to bring about turbulent motion of the lye. If such turbulent motion of the lye is not inhibited or suppressed to a sufficient extent, it disturbs the fat drop formation by imparting irregular motions to the fat streams in the lye and causing them to break up irregularly and thereby to a large extent into drops of widely varying sizes and to a considerable extent into rather small drops which promote both emulsion formation and over-saponification and produce undesirable variations during the residence time of the individual drops in the lye before they collect on top of the lye column and form thereon a layer of neutralized fat which can be continuously removed.

In order to achieve the desired breaking up of the large number of separate fat streams soon after their entrance into the lye column into separate drops of substantially equal size within the above stated range and preferably about 1.5 mm. and thereby sufficiently large for not promoting emulsion formation or over-saponification, I have found it necessary to hold the lye dampened against turbulence by means of turbulence dampeners consisting of vertical partitions subdividing the large total horizontal cross sectional area of the lye column on at least part of the height of the lye column from near the base thereof (namely at least in a lower region of the lye column where the separate fat streams flow like substantially vertically projecting footstalks up in the lye and break up into separate drops) into vertical cells of a horizontal cross sectional area in the range of about 5 to about 50 sq. cm. These cells should of course be open at their upper ends and preferably also at their lower ends. The greater the height and the smaller the horizontal cross sectional area of the cells, the greater their turbulence dampening effect in the lye column. The minimum turbulence dampening effect required for the purpose of my invention is the greater, the larger the number of separate fat streams brought to flow into the lye column per unit of the horizontal cross sectional area of the lye column. When this number is about ten thousands per sq. m. of the horizontal cross sectional area of the lye column and when using a preferred arrangement of the turbulence dampening vertical partitions so that they form between them vertical cells of square cross section, a length of about 4 cm. of the side of this square and a height of about 20 cm. of the vertical partitions have been found satisfactory also from the point of view that it is not desirable to reduce the total horizontal cross sectional area of the lye column by the total horizontal cross sectional area of the vertical partitions on a larger part of the height of the lye column than necessary for the purpose of my invention.

Also such turbulence or convection motion of the lye as may be caused by significant differences in temperature between different points of the lye column has a disturbing effect on the desired course of the bubbling up of the fat through the lye column and should be avoided by keeping the lye at substantially uniform temperature throughout the lye column. This may require heat insulation of the outer walls of the neutralizer since it is against my invention to agitate the lye by stirring or otherwise during the bubbling up of the fat through the lye column.

My invention also contemplates a preferred method and preferred means for effecting the subdivision of the feed of the fat to the lye column into the thousands of substantially equal separate streams, for realizing a desirable fairly uniform distribution of the outlets through which these streams enter the lye column at the base thereof over substantially the entire horizontal cross sectional area of the lye column, and for regulating the rate of flow and the initial velocity of these streams as required for achieving the desired course of the bubbling up of the fat through the lye column under the condition of substantial non-turbulence therein. The preferred means for these purposes comprise a division of the tank of the neutralizer by a perforated substantially horizontal partition or false bottom into an upper compartment containing the lye column through which the fat is bubbled up, and a lower compartment to which the degummed fat is fed. The subdivision of the feed of the fat into the thousands of substantially equal separate streams is effected preferably by distributors disposed in the upper compartment on or close to the horizontal false bottom and provided with spaced lateral openings forming the separate outlets for said streams. The fat is caused to flow through the holes in the false bottom up into said distributors from a fat layer which the fat fed to the lower compartment forms between the false bottom and a bottom layer of lye which communicates with the lye column in the upper compartment through a passage which by-passes said fat layer and keeps filled with lye. Uniform regulation of the rate of flow of the thousands of separate fat streams entering the lye column through the distributor outlets is achieved by the height of the fat layer in the lower compartment being regulated by the regulation of the feed of the fat thereto. By this method it has proved easy to cause the thousands of separate fat streams to flow into the lye column under little, if any, other motive force than their buoyancy in the dye and not only at such a rate of flow but also at such a moderate initial velocity that the streams, under the condition of substantial non-turbulence of the lye through which the fat is bubbled up, soon after their entrance into the lye column break up almost quantitatively into substantially equal drops of the desired size. In this connection I wish to say that it may happen and is acceptable and not outside the scope of my invention that the separate fat streams do not break up fully quantitatively into substantially equal drops of the desired size but to some small amount also into rather small, even minute, drops. These have been found to be no hindrance to taking the benefits of an almost quantitative division of the fat into substantially equal drops of a size sufficiently large for avoiding or minimizing undesirable emulsion formation and over-saponification and for ensuring a stay of all the substantially equal drops in substantially equal contact with the lye for a substantially equally long time and thereby achieve a substantially uniform treatment of substantially all parts of the fat with the lye.

I wish it to be observed that my invention solves the problem of avoiding or minimizing loss of neutral fat by emulsion formation and over-saponification and generally over-treatment or under-treatment of any considerable proportion of the fat with the lye in a manner radically different from that aimed at in continuous centrifugal refining which is the most advanced hitherto known and applied fat refining process. In continuous centrifugal refining as well as in all other known and applied industrial alkali wet refining of fat for edible use the lye during its action on the fat is present in an amount that is small as compared with the present amount of fat. In continuous centrifugal refining, in which degumming, neutralizing and decolorizing often are effected as a combined operation, one tries to minimize over-saponification by using strong caustic soda lye for the neutralization and by shortening the reaction time (the duration of the contact between lye and fat) as much as possible by vigorously dispersing the lye in the fat, thereby promoting emulsion formation and usually necessitating an emulsion-breaking treatment of the mixture of fat and lye before the separation of the neutralized fat from the spent lye (the soapstock). When the neutralization operation is carried out in accordance with my invention the dissolution of substances rendered water-soluble or hydratable by the degumming of the fat is enhanced and the risk for over-saponification and emulsion formation is diminished by using weak lye which during its action on the fat is present in an amount that is large as compared with the present amount of fat, and by subjecting substantially all small separate and substantially equal parts into which the fat is dispersed in the lye to a substantially uniform action of the lye both as regards the contact between fat and lye and as regards the duration of this contact. This duration and thereby the degree of elimination of free fatty acids varies with the height of the lye column, so that the required height of the lye column depends upon the desired degree of elimination of free fatty acids. The rate of elimination of free fatty acids during the travel of the fat drops up through the lye column decreases much more rapidly than proportionally to the decrease of the free fatty acid content in the fat, and for this reason variations in height of the lye column cause only relatively small variations in the degree of elimination of free fatty acids in the fat bubbled up through the lye column. By the guidance of general experience of fat refining, analyses of the fat and conventionally required laboratory tests for refining efficiency skilled refiners will be able to choose a suitable initial strength of the lye and a suitable initial height of the lye column for achieving optimum refining results with any given kind and quality of crude oil or other fat to be refined. When using caustic soda solution an initial strength thereof, expressed in normality, in the range about 0.3 to about 1.5 and an initial height of about 2 m. of the lye column have been found to be suitable for a thorough elimination of free fatty acids in most oils and other fats used industrially for the manufacture of such edible products as margarine.

In all refining of fats by means of alkali and thus also in my new method of carrying out the neutralization operation the alkali must be used in excess over the amount theoretically required for saponification of free fatty acids in the fat. Because alkali is consumed by the reactions taking place at the bubbling up of the fat through the lye column, the lye must be renewed continuously or at intervals. Though it is possible to do this by discharging spent lye (soapstock) from the neutralizer and adding fresh lye or alkali without or only with short interruption of the feed of fat to the neutralizer, my preferred method of renewing the lye is to change over the feed of fat to another neutralizer, charged in advance with fresh lye, when the alkali concentration of the lye in a neutralizer in operation has fallen to a normality, usually not lower than about 0.1, at which the lye has to be considered spent.

Within the purview of the principal objects and most important features of my invention as described above in comparison with acknowledged prior art, further objects and features of my invention will be apparent from the following description, with reference to the accompanying drawings, of forms of plant for carrying out my new fat refining process. In the drawings:

FIGS. 1, 2 and 3 are more or less diagrammatic views each of one section of a plant in which my new fat refining process can be carried out;

FIGS. 4 and 5 are fragmental vertical sections on a larger scale taken substantially on line IV—IV in FIG. 5 and on line V—V in FIG. 4, respectively, of a modified form of the neutralizer;

FIG. 6 is a vertical section of a further modified form of the neutralizer;

FIGS. 8 and 9 are fragmental vertical sections on a larger scale taken substantially on line VIII—VIII in FIG. 7 and on line IX—IX in FIG. 8, respectively;

FIGS. 10, 11 and 12 show diagrammatically three variations of the plant shown in FIGS. 1 to 3 and exemplify how the plant and the operation thereof may be varied for treating different oils requiring more or less different treatments for making them suitable for the manufacture of edible products such as margarine.

FIGS. 1 to 3 illustrate the first plant built and put into use for practising my invention on an industrial scale, the capacity of this plant being about 2000 to about 3000 kg. of fat per hour, depending on the nature of the fat.

Figure 7:
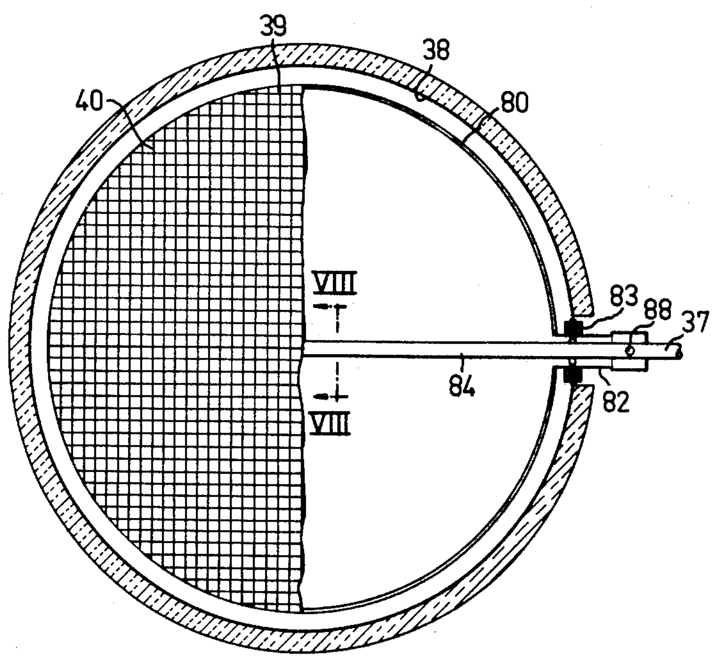
FIG. 7 is a horizontal section substantially on line VII—VII in FIG. 6.

As will appear from FIG. 1, the crude fat, which usually is a vegetable or animal oil, is taken into the plant in batches of a predetermined weight, preferably about 500 kg., via an automatic weighing machine 1 to the scalepan 2 of which the fat is supplied through a pipe 3. The interval of time between the batches is usually chosen in the range about 10 to about 15 minutes. The pretreatment of the fat with phosphoric acid is carried out semicontinuously in a vertical container 4 which is kept evacuated to an absolute pressure of preferably about 20 mm. Hg through a pipe 5 which is connected to a vacuum pump. Disposed beneath one another in the container 4 are four trays 6, 7, 8 and 9 of acid-proof material. Each batch of fat is passed to the uppermost tray 6 from the scalepan 2 through a pipe 10 and a spraying device 11 mounted above the tray 6 for deaerating the fat. For heating the fat the tray 6 contains a coiled pipe 12 which is heated by steam under the control of a thermostat-operated valve. To attain a good heat transfer between the steam-heated coil 12 and the fat in the tray 6 an agitator 13 is provided. The three upper trays 6, 7 and 8 are provided with drains 14, 15 and 16 provided with automatically controlled valves with large throughflow area for rapid discharge of each batch of fat from the uppermost tray 6 to the next following tray 7 and later on from this tray 7 to the next following tray 8 and finally from this latter tray to the lowermost tray 9. Orthophosphoric acid of high concentration, preferably 85 percent by weight, is added to the fat in the tray 7 from a container 17 through a pipe 18 under the control of an automatically operated dosage valve or pump 19. The tray 8 serves the purpose of allowing the phosphoric acid to act upon the fat for a sufficiently long time. The lowermost tray 9 serves as a buffer between the intermittent discharge of the fat thereto from the tray 8 and a continuous pumping of the fat from the tray 9 by means of a pump 20. It may be suitable to cool the fat in the tray 9 more or less by means of a coiled pipe 21 for cooling water. Agitators 22, 23 and 24 are disposed also in the trays 7, 8 and 9, and the agitators in all the trays are shown as driven by a common motor 25. The valves in the drains 14, 15 and 16 from the trays 6, 7 and 8, the phosphoric acid admixing valve 19, a valve 26 in the fat supply pipe 3 and a valve 27 in the pipe 10 can preferably be controlled from a common automatic program apparatus 28 in a system which automatizes the operation of the plant and which may be designed according to well-known principles and, therefore, is but very schematically indicated in the drawing. This system can be under the control of say a pair of floats 29 and 30 in the buffer tray 9 so that a new batch of fat is admitted to the container 4 as soon as the fat in the buffer tray 9 has sunk to a certain level, and so that the supply of fat to the automatic weighing machine 1 is interrupted when the fat in the tray 9 has risen to a certain higher level.

The pump 20 whose capacity corresponds to that of the plant pumps the fat pretreated with phosphoric acid through a pipe 31 to a filter 32 (FIG. 2) which comprises a container in which a number of filter leaves of fine mesh wire net are inserted through which the fat flow passes. At the start of the filtration a pre-coat of filter aid (pure kieselguhr, for example) is deposited on the filter leaves. This is effected as follows: in a container 34 connected to the pipe 31 through a float valve and a pipe 33 the filter aid is mixed with fat whereupon the mixture is pumped through the filter 32 by means of a pump 35 connected between the bottom of the container 34 and the pipe 33. At the start of the filtration the filter 32 and the container 34 are kept under vacuum to avoid contact of the fat with air. The evacuation takes place through a pipe 36 connected to the evacuated container 4. Until all filter aid has been deposited in the filter leaves, fat is pumped round from tray 9 through pipe 31, filter 32, pipe 37 and back to tray 9 through a pipe 54 connected to pipe 37 through a relief pressure valve 53.

After the filter aid has been deposited on the filter leaves in the filter 32 the filtered fat is passed through the pipe 37 to the neutralizer which comprises a vertical tank 38 (FIG. 2) which is of square cross section and has a horizontal cross-sectional area of about 2.25 sq. m. and a height of about 3.2 m. At some distance (about 7 cm.) over its funnel-shaped bottom the tank is provided with a horizontal partition or false bottom 39 dividing the interior of the tank into an upper compartment containing the lye column through which the fat is bubbled up and thereby neutralized, and a lower compartment receiving the feed of filtered fat from the filter 32 through the pipe 37. From a small distance (about 1 cm.) above the false bottom 39 the interior of the tank 38 is laterally divided on the greater part of its height into vertical cells by means of an insert consisting of vertical partitions 40 serving as turbulence dampeners in the lye column. The cells are of square cross section, and the side of the square is about 4 cm. The false bottom 39 has a hole 41 with a diameter of about 2 mm. directly beneath each of the vertical cells. Centrally the false bottom 39 is provided with a tube 42 secured at its upper end in an opening in the false bottom 39 and projecting a distance toward the apex of the funnel-shaped bottom of the tank which there has a drain 43 with a discharge valve through which the tank 38 can be emptied. Both the pipe 37 from the filter 32 and a pipe 44 with connections for the supply of lye and water to the tank 38 are connected thereto beneath the false bottom 39. At the upper end the tank 38 has a removable cover 45 with a centrally projecting neck portion 46 from which at a distance from its upper end there extends a pipe 47 having a valve 49 controlled by a float 48 in the neck portion 46. The bottom and walls of the tank 38 are heat insulated.

At start of work the tank 38 is first filled up to the neck portion 46 with lye of suitable concentration by lye and water being supplied through the pipe 44. Supply of fat through pipe 37 to the compartment beneath the perforated false bottom 39 in the tank 38 is then started. The amount of the lye being displaced by the fat is discharged from a suitable point of the tank 38 through a pipe 50 into a collecting container 51 from which the displaced lye can be pumped back to the tank 38 through a pipe 52 by means of a pump connected therein. For thorough elimination of free fatty acids in the fat the lye column over the false bottom 39 is adjusted to a height usually not less than about 2 m. and not greater than about 2.5 m. The fat supplied through pipe 37 forms a layer 74 beneath the false bottom 39 and penetrates from this layer 74 upwards through the holes 41. Beneath the fat layer 74 under the false bottom 39 there remains on the bottom of the tank 38 a layer 75 of lye in direct communication with the lye column above the false bottom 39 through the pipe 42 which by-passes the fat layer 74 and keeps filled with lye. The fat layers and lye layers in the tank 38 are indicated for greater clarity by different hatching, viz. the fat by vertical and the lye by horizontal hatching. From the fat layer 74 under the false bottom 39 the fat flows in substantially equal separate streams up in the lye column above the false bottom 39 through the holes 41 therein. Under substantially the sole action of their buoyancy in the lye these fat streams project from the holes 41 like footstalks substantially vertically up in the lye column and keep on dividing at their tops almost quantitatively into substantially equal separate drops of a size usually regulated to about 1.5 mm. These drops travel in spaced relationship and each substantially its shortest way and consequently with substantially the same rapidness up through the lye column and collect on the surface thereof into a layer which rises up into the neck portion 46 and is discharged therefrom through the pipe 47. The pressure on the fat causing it to flow into the tank 38 is delivered by the pump 20 and adjusted to and held constant at the value required for obtaining the desired size, in most cases preferably about 1.5 mm., of the substantially equal drops into which the fat divides upon or rather soon after entering the lye column over the false bottom 39 through the holes 41 therein. Said pressure, and with it the height of the fat layer 74 beneath the false bottom 39, varies with the rate of the continuous supply of fat to said fat layer and remains constant when the supply of fat to said fat layer and the flow of fat therefrom through the holes 41 balance each other so that the height of the fat layer 74 remains constant. Adjustment of the height of the fat layer 74 beneath the false bottom 39 adjusts the rate of flow of the fat streams from said layer up through the holes 41 and thereby the size of the drops into which the fat streams soon divide in the lye column above the false bottom 39. It follows that the drop formation can be regulated by regulating the output of the pump 20. The drop formation is influenced by the diameter of the holes 41 which, however, must be sufficiently large for not easily being clogged. For this and other practical reasons regulation of the drop size by regulation of the size of the holes 41, though at least theoretically possible, is preferably not resorted to.

The neutralized fat contains only so small residues of alkali and soap that the conventionally required washing of the fat for removal of such residues preferably can be dispensed with. Therefore the neutralized fat is discharged from the tank 38 through pipe 47 with exclusion of air into a container 57 at the top thereof through a spraying device 58. The container 57 is held evacuated (preferably to an absolute pressure of about 20 mm. Hg) through an evacuating pipe 59 and is provided with a steam jacket 60 for heating the fat, usually to a temperature in the range about 80 to about 90° C. In the container 57 citric acid, preferably in aqueous solution of a concentration of about 15 percent by weight, is added to the fat from a container 61 through a dosage pump 62 in the small amount, usually less than 0.05 percent by weight of the fat, required for splitting the small soap residue in the fat into free fatty acids dissolving in the fat, and alkali, and for converting this and other alkali in the fat into alkali citrate. The container 57 at the same time serves as a mixing container for the admixing of a filter aid (pure kieselguhr, for example) and is equipped with an agitator like that in the mixing container 34. The fat is pumped from the container 57 through a pipe 63 by means of a pump 64 to a filter 65 from which the filtered fat is passed through a pipe 66 and a safety and rest filter 67 to a storage tank or direct to deodorizing as desired. However, until the filter aid added in the container 57 has been deposited onto the filter leaves in the filter 65 and a clear filtrate has been obtained, the fat is pumped by means of the pump 64 through a return pipe 68 back to the container 57 in which the fat level is held constant by a float valve 69 connected to the pressure side of the pump 64. This pump is of overcapacity, and a pressure relief valve 70 inserted between the pressure and suction sides of the pump provides for the desirable limitation of the pressure on the fat to the filter 65. Any excess of citric acid as well as the formed alkali citrate is precipitated in solid form in the fat by the vacuum drying thereof and therefore removed by the filtration of the fat through the filter 65.

For interrupting the operation of the plant and emptying it, say for cleaning the filters or for renewing the lye, the following procedure is adopted. As regards the section for the treatment of the fat with phosphoric acid, on interruption of the work the amount of fat remaining in the lowermost tray 9 is pumped round through the filter 32 back to this tray until all of it has been filtered clear whereupon is it pumped by a smaller pump 71 through a rest filter 72 into the tank 38. This tank is emptied of fat, after the fat layer beneath the false bottom 39 has disappeared up through the holes 41, by water being supplied to the lower part of the tank so that the layer of neutralized fat is displaced and driven over into the drying container 57. For emptying this latter container and the filter 65 of the fat remaining therein, this fat rest is pumped round through the filter 65 by means of the pump 64 until filtered clear and is then driven out through the rest and safety filter 67 by means of a pump 73. Then the plant may have to be cleaned from oil rests therein. These untreated oil rests should be collected and their weight subtracted from the weight of the weighed-in crude fat when it is desired to make a true calculation of the achieved refining efficiency expressed as weighed-out refined fat in percentage of the weight of neutral fat in weighed-in and treated crude fat.

One purpose of the design of the plant shown and described is to keep the fat being treated out of contact with air at start and close of work as well as during full operation of the plant.

FIGS. 4 and 5 illustrate modified and improved means for effecting the subdivision of the feed of fat to the lye column in the thousands of separate substantially equal fat streams and for causing them to enter the lye column under little, if any, other motive force than their buoyancy in the lye and in a fairly uniform distribution over the entire horizontal cross-sectional area of the lye column. As is apparent from FIGS. 4 and 5, the false bottom 39 is provided with holes 41 arranged in rows, and over each row of holes there is disposed on the false bottom 39 a fat distributing channel 76. On account of the fact that the fat in the lye tends to ascend and not to descend, the channel 76 is inverted (turned with its bottom up) for really acting as a channel for the fat in the lye. The side walls of the channel 76 are apertured with the apertures 77 spaced apart by remaining teeth 78 of such a shape that the apertures 77 between the teeth 78 extend up to the upturned bottom of the channel 76 and preferably decrease in width in the upward direction. The fat flowing up through the holes 41 into each channel 76 distributes itself into a layer beneath the upturned bottom of the channel. From this layer substantially equal separate continuous streams 79 of fat flow through the apertures 77 into the lye column above the false bottom 39. Because of flowing from the very beginning under the action of nearly no other motive force than their buoyancy in the lye the streams 79 project like footstalks from the apertures 77 substantially vertically up in the lye and soon divide at their tops almost quantitatively into substantially equal drops which rise in interspaced relation and each practically its shortest way up through the lye column to the surface thereof. This results in substantially equal duration of the stay of each of the substantially equal drops in full surface contact with the lye. It is a requisite, however, for the obtention of these results that turbulence in the lye column is suppressed by the turbulence dampers 40 at least to the extent required for inhibiting such whirling, fluttering or flexing of the fat streams 79 in the lye as would result in an irregular drop formation of the fat in the lye and possibly also in splitting or flowing together of formed drops by collisions between them.

FIGS. 6 to 9 illustrate a still further modified and improved form of the neutralizer. The tank 38 is of round cross section and the bottom of the tank is preferably horizontal. The horizontal partition or false bottom 39 which divides the interior of the tank into the upper compartment for holding the lye column through which the fat is bubbled up, and a lower compartment to which the pre-treated (degummed) and filtered fat is fed through the tube 37, consists of the upper end wall of a round and flat (disc-like) casing 80 which by means of short legs or distance pieces 81 rests on the bottom of the tank and which between its circumference and the cylindrical wall of the tank leaves a distance to provide for an always open communication between the upper compartment of the tank and the space between the casing 80 and the bottom of the tank. The casing 80 is provided with a two-part socket 82 projecting radially out through an opening in the wall of the tank 38. The two parts of the socket 82 are attached to the wall of the tank and thereby to each other by means of flanges indicated at 83 in FIGS. 6 and 7. In the socket 82 there is fitted a tube 84 which is connected to the pipe line 37 and forms an extension thereof and projects into the casing 80 substantially diametrically thereof and is provided in its upper side with a longitudinal slot 85 (FIG. 8) and is closed at its free end. The fat to be neutralized is fed to the casing 80 through the tube 84 and distributes itself through the slot 85 fairly uniformly to the layer 74 into which the fat spreads on the lye layer 75 which extends up into the casing 80 as indicated in FIGS. 8 and 9. Outside the tank 38 the socket 82 has a depending pocket 86 (FIG. 6) provided with a sight glass 87. A transparent tube 88 extends from the tube 84 down into the pocket 86. At start of work with the tank 38 charged with fresh lye, the lye in tube 84 is expelled therefrom through tube 88 by the fat supplied from pipe 37. During work there is between fat and lye in the tube 88 a border-line observable through the sight glass 87. From the bottom of the tank 38 there extends a draining pipe 89 with a shut-off valve 90, and from the bottom of the pocket 86 there extends a conduit 91 having a branch connected to the pipe 89 over a shut-off valve 92, and a second branch connected to a steam supply pipe 93 over a shut-off valve 94. During work the lye layer 75 is kept in lye-filled communication with the lye column above the casing 80 in the tank 38 through the connections 89, 93, 91, 86, 82. The pipe 44 for the supply of lye and water to the tank 38 is connected to the pipe 89 over a shut-off valve 95. Holes 41 in the false bottom 39 and fat distributing channels 76 over the rows of holes 41 are arranged as in the form of FIGS. 4 and 5 with the exception that the upturned bottom of the channel 76 over each row of holes 41 has a slight slope from a point intermediate each two adjacent holes 41 toward each of the two holes, as is apparent from FIG. 8. This slight slope assists to distribute the fat uniformly to the distributor outlets 77. The turbulence dampeners 40 are arranged as described with reference to the form of neutralizer shown in FIG. 2 with the exception that the turbulence dampeners 40 extend only to about 20 cm. above the level at which the fat streams 79 enter the lye column through the fat distributor outlets 77. In the upper region of the tank 38 and preferably clamped between the upper end of the cylindrical wall of the tank 38 and the removable cover 45 there is a substantially horizontal foraminated partition 96 preferably consisting of a stainless steel wire net with a diameter of the wire of about 0.5 mm. and with about 10 to about 20, preferably about 15 meshes per inch, through which the fat bubbled up through the lye column has to pass on its way up to the neck portion 46 from which it is withdrawn through the pipe 47 under the control of the float operated valve 49. The wire net 96 has been found to enhance and speed up the rupture of any soap films on the fat drops collecting on top of the lye column. The ruptured soap films separate from the fat drops and sink into the lye, and the collecting fat drops flow together and form a homogeneous layer of neutralized fat containing only very small residues of lye and soap.

The provision and arrangement of the casing 80 as shown and described serves the purpose of making it possible to clean the neutralizer, and especially the means therein for the division of the fat feed into the thousands of separate substantially equal fat streams 79, by blowing with steam which is supplied through the steam pipe 93 and conducted therefrom through the conduit 91 and the socket 82 and the tubes 88 and 84 into the casing 80 from which the steam has no other outlets than the holes 41 directing the steam up into the distributors 76.

With the use of very weak caustic alkali lye for the neutralization in the neutralizer it may happen that the fat after passing through the lye column does not separate satisfactorily from the lye. Any such difficulty can easily be overcome by increasing the ionic strength of the lye by neutral electrolytes (neutral salts) such as for example $NaCl$, $KCl$, $NH_4Cl$, $Na_2SO_4$. A small content, for example about 0.25 percent by weight, of such an electrolyte, preferably $NaCl$, in the lye is sufficient for causing the fat to separate satisfactorily from the lye.

The size of the separate drops into which the fat streams 79 divide is influenced by the interface tension between fat and lye, which can be altered in a favourable direction by a lowering of the surface tension of the lye. I have found that a lowering of the surface tension of the lye by some suitable alkali resistant surface-active agent can be resorted to for expediting the obtention of the desired size of the fat drops. Several alkali resistant surface-active agents, also called wetting agents, are available on the market for use as detergents, and among them a detergent consisting of a 60 percent by weight alkylarylsulfonate has been found most suitable. A small content, for example about 0.25 percent by weight, of this detergent in the lye is sufficient for overcoming any difficulty to bring the fat streams 79 to divide into not too small drops. This same expedient also appears to have an improving effect on the drop formation as regards the uniformity of the substantially equal drops into which the fat streams 79 almost quantitatively divide.

In the variations of the refining plant schematically illustrated in FIGS. 10, 11 and 12 there are only three trays (6, 8 and 9) in the vacuum drying container 4 in which the pretreatment with phosphoric acid is performed, in that the phosphoric acid is added to and mixed with the oil in the uppermost tray 6 in which a cylindrical heating element 120 is substituted for the coiled heating pipes 12 in FIG. 1. In all the three variations illustrated in FIGS. 10, 11 and 12 the neutralizer 38 is of the construction shown in and described with reference to FIGS. 6 to 9. For economical reasons a centrifugal clarificator (not shown) can be connected in the pipe line 31 for separating off the greater part of the sludge in the pretreated oil before the filtration through the filter 32.

In the variation of the plant illustrated in FIG. 11 there are provided in the vacuum drying container 57, in which the citric-acid treatment finishing the neutralization operation is performed, three superimposed trays 97, 98, 99 of which the two uppermost have bottom outlets automatically controlled by valves 100 and 101, respectively. The oil is passed from the neutralizer 38 through the pipe 47 and the spraying device 58 continuously to the uppermost tray in which the oil is treated with citric acid continuously supplied through the dosage means 61, 62. From the tray 97 the oil is passed batchwise to the tray 98 and therefrom batchwise to the tray 99 from which the oil is pumped continuously to and through the filter 65. Motor-driven stirrers 103 like those in the trays in the vacuum drying container 4 are provided in the trays in the vacuum drying container 57. Dosage means 104 are provided for adding filter aid and, if needed, bleaching earth to the oil in the intermediate tray 98.

The variation of the plant illustrated in FIG. 12 differs from the variation illustrated in FIG. 11 by an additional tray 105 being provided between the trays 97 and 98 in the vacuum drying container 57. The oil is passed from this additional tray 105 to the tray 98 through a centrifugal separator 106 located outside the container 57. There are also the further differences that the citric acid dosage means 61, 62 are arranged to add the citric acid to the oil in the lowermost tray 99 and that dosage means 107 are provided for adding a small amount of some reagent, preferably in aqueous solution, that is known or found to further the elimination of coloring matter and/or other undesirable substances such as oxidation products in the fat. Examples of such reagents are sodium hydroxide and sodium carbonate. When using any of these reagents a small amount of precipitating soap is formed which in statu nascendi adsorbs coloring matter and possibly also other undesirable substances in the oil. The formed soap is separated from the oil in the centrifugal separator 106 before the oil is passed to the trays 98 and 99 in which filter aid and, if needed, bleaching earth and citric acid are added to the oil by the means 104 and 61, 62 prior to the final filtration of the oil through the filter 65.

All directions concerning the construction and operation of the refining plant given in the above description with reference to FIGS. 1 to 9 are applicable also to the variations of the plant schematically illustrated in FIGS. 10, 11 and 12 as far as not altered by the above description of these variations.

In all refining of oils for edible purposes and thus also in the refining of oils by my new refining process the refiner must vary the thoroughness of the various treatments, especially the pretreatment (degumming) with the nature and quality of the crude oil to be refined in order to obtain as good refining results as possible both from the point of view of cost and of refining efficiency and purity and color of the oil when ready for edible use or for the manufacture of edible products such as margarine. Only a rough grouping of the most common oils that are refined industrially for edible purposes can be given with respect to how thoroughly they usually have to be treated for obtaining satisfactory refining results by my new refining process, namely:

(i) Oils with a low content of lecithin and a low content of coloring matter. Customarily coconut oils, palm kernel oils and hydrogenated oils of good qualities belong to this group. For the degumming of oils of this group by phosphoric acid only a very small amount thereof is required, and there is no need of bleaching after the neutralization operation.

(ii) Oils with a high content of lecithin and a moderate content of coloring matter. Customarily soybean oils, rapeseed oils and pale palm oils of good qualities belong to this group. For the degumming of oils of this group by phosphoric acid the required amount thereof is greater than that required for oils of group (i). There is usually no need of bleaching after the neutralization operation.

(iii) Oils with a high content of lecithin and a high content of coloring matter. Cottonseed oils and dark palm oils are examples of oils customarily belonging to this group. For the degumming of oils of this group by phosphoric acid the required amount thereof is still greater than that required for oils of group (ii), and after the neutralization operation bleaching by bleaching earth may be required and can be performed by adding the bleaching earth to the oil in the finishing step of the refining process, that is in the vacuum drying container 57 in which the oil is treated for a thorough elimination of soap residue prior to the final filtration prior to the deodorization.

For a full understanding of the further elucidation of the invention below by examples of how and with what results my new refining process has been adapted for the refining of various oils there is first given below an acount of the methods used for determining the results. The following abbreviations are used: AOCS=Official and Tentative Methods of the American Oil Chemists Society; DGF=Einheitsmethoden der Deutschen Gesellschaft für Fettwissenschaft; IUPAC=International Union of Pure and Applied Chemistry; ffa=free fatty acids.

*Ffa.*—AOCS Official Method Ca 5a–40.

*Iodine value.*—Wijs Method. AOCS Official Method Cd 1–25 as revised April 1956.

*Saponification value.*—AOCS Official Method Cd 3–25 as revised April 1955.

*Peroxide value.*—Method of C. H. Lea. AOCS Official Method Cd 8–53., expressing the peroxide value in milliequivalents of $O_2$ per 1000 gr. of fat.

*Benzidine value.*—Determination according to IUPAC Annexe $I_3$—1961.

*Neutral oil.*—The AOCS method for determination of neutral oil. AOCS Method Ca 9f–57 (Official 1960). This method has been used for determining the content of neutral oil consisting essentially of triglycerides plus unsaponifiable fatty matter in the crude oil, ffa and non-fatty matter in the oil being retained by the activated alumina column used in his test. When the crude oil had a high content of lecithin the neutralized oil was checked for residual phosphorus content which, if any, indicated that some lecithin had passed the alumina column. In all such cases the figures have been corrected according to the result of this checking.

*Moisture and volatile matter.*—AOCS Official Method Ca 2c–25 as revised April 1956. This method determines the moisture and any other matter volatile under the conditions of the test.

*Insoluble impurities.*—Determination according to DGF-Method CIII 11(53). The method determines dirt, meal and other foreign substances insoluble in petroleum ether.

*Soap content of refined oil.*—Method of Wolff: Journal of the American Oil Chemists Society 34, 293 (1957). Soap content expressed as percentage of sodium soap by weight of the fat.

*Lecithin and other phosphatides.*—AOCS Official Method Ca 12–55, counting percentage of phosphatides by the weight of the fat as equivalent to 30 times the percentage of phosphorus by weight of the fat.

*Color.*—AOCS Tentative Method Cc13c–50, determining the optical density for yellow color at wave length 4600 A, for red color at wave length 5500 A, and for green color at wave length 6700 A.

*Notes.*—The iodine value is a measure of the unsaturation of a fat. The iodine value and the saponification value are characteristic values by which a fat can be identified. Good correlation between these values for incoming and for outgoing oil indicates that no contamination of the oil has occurred in the refining process. The peroxide value and the benzidine value each and togther give an indication of the oxidative status of the oil. As peroxides and carbonyl compounds constitute the precursors of bad-tasting decomposition products it is in the interest of the refiner that the peroxide and benzidine values are low from the beginning and are decreased in the refining process or at least kept as low as possible.

*Example 1.—Refining of a crude coconut oil*

A feeding tank for the refining plant was charged with 15,086.5 kg. of a crude coconut oil. Analyses of the crude oil showed:

| | | |
|---|---|---|
| Free fatty acid | percent | 3.94 |
| Iodine value | | 8.7 |
| Saponification value | | 256 |
| Peroxide value | | 0.0 |
| Benzidine value | | 2.8 |
| Neutral oil | percent | 95.29 |
| Moisture | do | 0.08 |
| Insoluble impurities | do | 0.02 |

The oil was preheated in a heat exchanger and passed in batches, each amounting to about 500 kg., at the frequency of one batch every 15 minutes, to the phosphoric acid treatment unit (the vacuum drying container 4) of the plant and there deaerated, vacum dried and heated to 75° C. The vacuum in the container 4 was kept at 20 mm. Hg. absolute pressure. To each batch of oil there was added about 0.04 percent by weight of phosphoric acid of a concentration of 85 percent by weight. A total of 6.5 kg. of phosphoric acid was added to the total of oil. After the prolonged reaction time in the trays in the container 4 the phosphoric-acid-treated oil was pumped continuously from the lowermost tray 9 to and through the filter 32 which was given a precoat with in all 14 kg. of a filter aid known under the trade-mark Hyflo, which is a purified kieselguhr (diatomaceous earth). After the filtration of all the oil 36 kg. of filter cake were collected, which contained, in addition to the spent filter aid, impurities, phosphoric acid and some retained oil.

After the filtration the filtered oil was passed to the neutralizer (the container 38) which was charged in advance with 4,700 liters of a lye containing per liter 32 gr. of sodium hydroxide dissolved in demineralized city water. The horizontal cross sectional area of the lye column through which the oil was bubbled up in the neutralizer as 2.25 sq. m. The temperature of the lye was kept at 72° C. Analyses of the neutralized oil showed:

| | Percent |
|---|---|
| Free fatty acid | 0.04 |
| Moisture | 0.11 |
| Soap | traces |

The neutralized oil was passed to the citric acid treatment unit (the vacuum drying container 57), of the refining plant and there heated to 90° C. and vacuum dried at 20 mm. Hg absolute pressure and treated with about 0.01 percent by weight of citric acid which was added in aqueous solution of a concentration of 15 percent by weight. The oil was then pumped through the filter 65 which was give a precoat with in all 4 kg. of the filter aid Hyflo. The weight of collected filter cake was 10 kg. Analyses of the citric-acid-treated and filtered oil showed:

| | | |
|---|---|---|
| Free fatty acid | percent | 0.04 |
| Iodine value | | 8.7 |
| Peroxide value | | 0.0 |
| Benzidine value | | 0.8 |
| Moisture | percent | <0.01 |
| Insoluble impurities | do | <0.01 |

On cleaning the plant from oil rests after close of work 26.8 kg. of oil could be collected. The yield of neutralized oil was 14,242 kg.

The soapstock was acidulated with sulfuric acid for recovering the fatty acids. The dry weight of recovered fatty acids was 702 kg.

Analyses of the acidulated soapstock (the so-called acid oil) showed:

| | Percent |
|---|---|
| Free fatty acid | 94 |
| Moisture | 1.2 |
| Insoluble impurities | 0.02 |

*Example 2.—Refining of a crude hydrogenated whale oil*

A feeding tank for the refining plant was charged with 49,231.5 kg. of a crude hydrogenated whale oil. Analyses of the crude oil showed:

| | | |
|---|---|---|
| Free fatty acid | percent | 0.29 |
| Iodine value | | 52 |
| Saponification value | | 189 |
| Peroxide value | | 1.1 |

| | |
|---|---|
| Benzidine value | 2.3 |
| Neutral oil ----percent-- | 99.44 |
| Moisture ----do---- | <0.02 |
| Insoluble impurities ----do---- | <0.01 |

From the feeding tank the oil was passed in batches, each amounting to about 500 kg., at the frequency of one batch every 15 minutes, to the phosphoric acid treatment unit of the refining plant through a heat exchanger in which the oil was preheated to about 75° C. before it was introduced into the vacuum drying container 4 in the first tray 6 in the container 4 the oil was deaerated and vacuum-dried and the temperature adjusted to 80° C. The vacuum in the container 4 was kept at 20 mm. Hg absolute pressure. To each batch of oil there was added about 0.03 percent by weight of phosphoric acid of a concentration of 85 percent by weight. The total amount of phosphoric acid added to the total amount of oil was 15.8 kg. After the prolonged reaction time in the trays the oil was pumped continuously from the lowermost tray 9 and through the filter 32 which was given a precoat and during the operation two further coats with in all 39.3 kg. of kieselguhr (Hyflo). After the oil in the feeding tank had been worked up and the filter leaves had been sucked, 82.2 kg. of filter cake could be collected, which contained, in addition to the spent filter aid, impurities, phosphoric acid and some retained oil.

The neutralizer (the container 38) was charged in advance with 4,700 liters of a lye containing 12.0 gr. of sodium hydroxide per liter, 0.25 percent of a 60 percent alkylarylsulfonate (surface tension lowering agent), and 0.25 percent of sodium chloride (neutral additional electrolyte), all dissolved in demineralized city water. The horizontal cross sectional area of the lye column through which the phosphoric-acid-treated and filtered oil was bubbled up was 2.25 sq. m. The temperature at which the neutralization was carried out was 85° C. Analyses of the neutralized oil showed:

| | Percent |
|---|---|
| Free fatty acid | 0.03 |
| Moisture | 0.15 |
| Soap | traces |

The neutralized oil was continuously withdrawn from the neutralizer (the container 38) to the citric acid treatment unit (the vacuum drying container 57) of the plant, in which the oil was heated to 85° C. and vacuum dried and treated with about 0.01 percent by weight of citric acid which was added continuously in aqueous solution of a concentration of 15 percent by weight. The citric-acid-treated and vacuum dried oil was pumped through the filter 65 which was given a precoat of kieselguhr (Hyflo). The total amount of kieselguhr used was 9 kg., and the weight of collected filter cake was 46.4 kg.

Analyses of the citric-acid-treated and filtered oil showed:

| | |
|---|---|
| Free fatty acid ----percent-- | 0.03 |
| Iodine value | 52 |
| Saponification value | 189 |
| Peroxide | 0.5 |
| Benzidine value | 1.8 |
| Moisture ----percent-- | 0.02 |
| Insoluble impurities ----do---- | 0.01 |

On cleaning the feeding tank and the refining plant from all rests of oil after close of work 166.8 kg. of oil could be collected. The total yield of neutralized oil was 48,800 kg.

The soapstock was acidulated with sulfuric acid to recover the fatty acids. The recovered fatty acids had a dry weight of 147 kg. Analyses of the acid oil showed:

| | Percent |
|---|---|
| Free fatty acid | 98 |
| Moisture | 1.3 |
| Insoluble impurities | <0.02 |
| Mineral acid | traces |

*Example 3.—Refining of a crude rapeseed oil*

A feeding tank for the refining plant was charged with 11,183 kg. of a crude rapeseed oil. Analyses of the crude oil showed:

| | |
|---|---|
| Free fatty acid ----percent-- | 1.78 |
| Iodine value | 103 |
| Saponification value | 174 |
| Peroxide value | 4.5 |
| Benzidine value | 1.3 |
| Neutral oil ----percent-- | 97.65 |
| Moisture ----do---- | 0.08 |
| Insolublie impurities ----do---- | 0.03 |

From the feeding tank the oil was passed through and preheated in a heat exchanger and then to the phosphoric acid treatment unit of the refining plant in batches and deaerated and vacuum dried as in Examples 1 and 2 and heated to 85° C. and treated with about 0.4 percent by weight of a 85 percent phosphoric acid. After the prolonged reaction time in the trays in the vacuum drying container 4 the oil was pumped continuously from the lowermost tray in this container to and through a filter having a filter area of 6 sq. m. which was given a precoat of kieselguhr (Hyflo) and further coats of this filter aid in the course of the work. For the total of oil a total of 45.6 kg. of phosphoric acid and a total of 28.9 kg. of kieselguhr were used. After finishing the operation and sucking the filter leaves 80.0 kg. of filter cake were collected which contained, in addition to the spent filter aid, impurities, phosphoric acid and some retained oil. In the pipe line through which the pretreated and filtered oil was pumped to the neutralizer there was connected a mixer with a rotating stirrer driven at a moderate speed. In this mixer about 3 percent by volume of demineralized city water was continuously mixed with the oil. This modification of the process led to a slightly better yield of neutral oil. The neutralizer had been charged in advance with 4700 liters of a lye containing 12 gr. of sodium hydroxide per liter and 0.25 percent by volume of a 60 percent alkylarylsulfonate and 0.25 percent by weight of sodium chloride, all dissolved in demineralized city water. The temperature of the lye was 85° C., and the horizontal cross sectional area of the lye column through which the oil was bubbled up was 2.25 sq. m. Analyses of the neutralized oil showed:

| | Percent |
|---|---|
| Free fatty acid | 0.092 |
| Moisture | 0.15 |
| Soap | traces |

From the neutralizer the neutralized oil was continuously withdrawn to a vacuum drying unit (container 57) similar to that shown in FIG. 12. In this unit the temperature was adjusted to about 85° C., and in the first tray 97 sodium carbonate in an amount of about 0.04 percent by weight of the oil was added in the form of an aqueous solution containing 212 gr. $Na_2CO_3$ per liter. After about 15 minutes reaction time in the second tray 105 a small amount of kieselguhr (Hyflo) was added in the third tray 98. Finally the oil was continuously passed through a filter 65 with a filter area of 6 sq. m. For the total of the oil a total of 13 kg. of kieselguhr was used, and after finished operation 34.4 kg. of filter cake were collected. Analyses of the refined oil after the final filtration showed:

| | |
|---|---|
| Free fatty acid ----percent-- | 0.04 |
| Iodine value | 103 |
| Saponification value | 174 |
| Peroxide value | 1.7 |
| Benzidine value | 2.0 |
| Moisture ----percent-- | <0.02 |
| Insoluble impurities ----do---- | <0.01 |

On draining of the plant from all oil rests 169 kg. of oil could be collected and deducted from the input of crude oil. The weight of the dry refined oil was 10,670 kg.

The soapstock was acidulated and analyses of the acid oil showed:

| | Percent |
|---|---|
| Free fatty acid | 94 |
| Moisture | <1.0 |
| Insoluble impurities | <0.01 |
| Mineral acid | traces |

The dry weight of recovered fatty acids was 307 kg.

*Example 4.—Refining of a crude soybean oil*

A feeding tank for the refining plant was charged with 12,481.8 kg. of a crude soybean oil. Analyses of the crude oil showed:

| | |
|---|---|
| Free fatty acid ----percent | 0.37 |
| Iodine value | 132 |
| Saponification value | 193 |
| Peroxide value | 1.7 |
| Benzidine value | 1.4 |
| Neutral oil ----percent | 98.98 |
| Moisture ----do | 0.05 |
| Insoluble impurities ----do | 0.03 |

The crude oil was preheated in a heat exchanger and passed in batches to the first tray of the phosphoric acid treatment unit and deaerated, heated to 85° C. and vacuum dried as in the preceding examples. In said first tray about 0.16 percent by weight of phosphoric acid of a concentration of 85 percent by weight was added to each batch of oil. A total of 19.8 kg. of phosphoric acid was added to the total oil. After the prolonged reaction time in the trays the oil was continuously pumped to and through a filter with a filter area of 6 sq. m. which was given a precoat and in the course of the work further coats of in all 14.3 kg. of kieselguhr (Hyflo). After finishing the operation and sucking the filter leaves 61.5 kg. of filter cake could be collected which contained, in addition to the spent filter aid, impurities, phosphoric acid and some retained oil.

The pretreated and filtered oil was continuously fed to the neutralizer which was charged in advance with 4700 liters of a lye containing 12 gr. of sodium hydroxide per liter, 0.25 percent by weight of sodium chloride and 0.25 percent by volume of a 60 percent alkylarylsulfonate, all dissolved in demineralized city water. The horizontal cross sectional area of the lye column was 2.25 sq. m., and the temperature of the lye was 85° C. Analyses of the neutralized oil bubbled up through the lye column in the neutralizer showed:

| | Percent |
|---|---|
| Free fatty acid | 0.14 |
| Moisture | 0.10 |
| Soap | traces |

From the neutralizer the neutralized oil was continuously withdrawn to a vacuum drying unit and treated with an aqueous solution of sodium carbonate and finally filtered as in Example 3, except that the sodium carbonate was used in an amount of about 0.05 percent by weight of the oil, and that in all 5 kg. of kieselughr (Hyflo) were used for the filtration. The weight of collected filter cake was 14.6 kg. Analyses of the oil after the final filtration showed:

| | |
|---|---|
| Free fatty acid ----percent | 0.05 |
| Iodine value | 132 |
| Saponification value | 193 |
| Peroxide value | 0.8 |
| Benzidine value | 2.6 |
| Moisture ----percent | <0.02 |

On draining the plant from all oil rests 52.5 kg. of oil could be collected and deducted from the input of crude oil. The yield of neutralized oil was 12,264 kg. (dry weight).

Analyses of the acid oil obtained by acidulating the soapstock showed:

| | Percent |
|---|---|
| Free fatty acid | 93 |
| Moisture | 1 |
| Impurities | 0.05 |
| Mineral acid | traces |

The dry weight of recovered fatty acids was 113 kg.

*Example 5.—Refining of a crude palm oil*

A feeding tank for the refining plant was charged with 12,549.4 kg. of a crude palm oil. Analyses of the crude oil showed:

| | |
|---|---|
| Free fatty acid ----percent | 5.08 |
| Iodine value | 56 |
| Saponification value | 198 |
| Peroxide value | 3.4 |
| Benzidine value | 18.7 |
| Neutral oil ----percent | 94.15 |
| Moisture ----do | 0.09 |
| Insoluble impurities ----do | 0.05 |

After having been preheated to about 80° C. in a heat exchanger the crude oil was passed to the first tray of the phosphoric acid treatment unit of the plant in batches and deaerated and vacuum dried as in the preceding examples. The temperature was adjusted to 85° C. In the said first tray 0.1 percent by weight of phosphoric acid of a concentration of 85 percent by weight was added to each batch of oil. To the total of oil a total of 14.7 kg. of phosphoric acid was added. After the prolonged reaction time in the trays the oil was pumped continuously through a filter with a filter area of 6 sq. m. which was given a precoat and in the course of the work further coats with in all 19.9 kg. of kieselguhr (Hyflo). After finishing the operation and sucking the filter leaves 63.2 kg. of filter cake could be collected which contained, in addition to the spent filter aid, impurities, phosphoric acid and some retained oil.

The neutralization of the pretreated and filtered oil was carried out under the same conditions as in Example 4, and analyses of the neutralized oil showed:

| | Percent |
|---|---|
| Free fatty acid | 0.26 |
| Moisture | 0.12 |
| Soap | traces |

From the neutralizer the neutralized oil was withdrawn to a vacuum drying unit and treated with an aqueous solution of sodium carbonate and finally filtered as in Example 3, except that in all 8.0 kg. of kieselguhr (Hyflo) was used for the filtration. The weight of collected filter cake was 21 kg.

Analyses of the oil after the final filtration showed:

| | |
|---|---|
| Free fatty acid ----percent | 0.06 |
| Iodine value | 56 |
| Peroxide value | 2.1 |
| Benzidine value | 14.1 |
| Moisture ----percent | <0.02 |
| Insoluble impurities ----do | <0.01 |

On draining the plant from all oil rests 42.4 kg. of oil could be collected and deducted from the input of crude oil. The total yield of neutralized oil was 11,575 kg.

The dry weight of fatty acids in the soapstock was found to be 859 kg. Analyses of the acid oil obtained by acidulating the soapstock showed:

| | Percent |
|---|---|
| Free fatty acids | 93.5 |
| Moisture | 0.8 |
| Impurities | 0.02 |
| Mineral acid | traces |

The crude oils treated in Examples 3, 4 and 5 contained undesirable green coloring matter, and therefore color determinations were performed on samples of these oils before and after the pretreatment with phosphoric acid, after the neutralization, after a bleaching of the neutralized oil with bleaching earth, and after deodorization. The values found are recorded in the following table:

| | Yellow | Red | Green |
|---|---|---|---|
| Rapeseed oil of Example 3: | | | |
| Crude | 11.1 | 0.360 | 0.868 |
| Pretreated | 5.07 | 0.396 | 0.035 |
| Neutralized | 6.23 | 0.466 | 0.022 |
| Bleached | 0.238 | 0.024 | 0.006 |
| Deodorized | 0.053 | 0.014 | 0.004 |
| Soybean oil of Example 4: | | | |
| Crude | 10.0 | 0.122 | 0.063 |
| Pretreated | 8.3 | 0.068 | 0.018 |
| Neutralized | 8.2 | 0.068 | 0.012 |
| Bleached | ---------- | 0.110 | 0.005 |
| Deordized | 0.137 | 0.027 | 0.005 |
| Palm oil of Example 5: | | | |
| Crude | 25 | 4.85 | 0.120 |
| Pretreated | ---------- | ---------- | ---------- |
| Neutralized | 25 | 5.30 | 0.110 |
| Bleached | 0.760 | 0.054 | 0.013 |
| Deodorized | 0.130 | 0.009 | 0.005 |

A compilation of data from the refining of the five different oils of Examples 1 to 5 is given in the following table:

| | Coconut oil | Hardened Whale oil | Rapeseed oil | Palm oil | Soybean oil |
|---|---|---|---|---|---|
| | Weight in kg. | | | | |
| Treated crude oil | 15,060 | 49,064 | 11,014 | 12,507 | 12,429 |
| Yield of neutralized oil | 14,242 | 48,800 | 10,670 | 11,575 | 12,264 |
| Yield of acid oil | 702 | 147 | 293 | 859 | 113 |
| Loss of oil | 116 | 117 | 51 | 73 | 52 |
| Ffa in crude oil | 593 | 142 | 196 | 635 | 46 |
| | In percentage of weight of crude oil | | | | |
| Neutral oil in crude oil | 95.29 | 99.46 | 97.65 | 94.15 | 98.98 |
| Ffa in crude oil | 3.94 | 0.29 | 1.78 | 5.08 | 0.37 |
| Lecithin in crude oil | ---------- | ---------- | 0.43 | 0.03 | 0.32 |
| Yield of neutralized oil | 94.57 | 99.46 | 96.88 | 92.55 | 98.67 |
| Yield of acid oil | 4.66 | 0.30 | 2.66 | 6.86 | 0.91 |
| Filter loss of oil | 0.14 | 0.12 | 0.20 | 0.29 | 0.25 |
| "Unaccounted for" loss of oil | 0.63 | 0.12 | 0.26 | 0.30 | 0.17 |
| | Percent by weight | | | | |
| Ffa in neutralized oil | 0.04 | 0.03 | 0.06 | 0.06 | 0.05 |
| Ffa in acid oil | 94 | 98 | 94 | 93.5 | 93 |
| | Yield of neutralized oil in percentage of weight of neutral oil in crude oil | | | | |
| Refining efficiency | 99.24 | 100 | 99.21 | 98.30 | 99.69 |

What I claim and desire to secure by Letters Patent is:

1. In a process for refining crude fatty oil wherein said oil is degummed with acid, neutralized with aqueous alkali solution and subsequently treated with acid, the improvement wherein (1) said degumming is effected under reduced pressure with orthophosphoric acid and (2) said neutralization is effected by passing the degummed oil up through alkaline aqueous solution, said oil being fed into said solution in a plurality of separate streams and rising through the solution due solely to the buoyancy forces existing between the oil and aqueous solution, said streams, while in contact with said solution, breaking at their upper ends into droplets of 0.3 to 3 mm. in diameter, said droplets then continuing to rise through said solution to form an oil layer thereon, whereby the oil is intimately contacted with the alkali solution to neutralize fatty acids therein while concomitantly avoiding substantial saponification and emulsification.

2. In a process for refining crude fatty oil wherein said oil is degummed with acid, neutralized with aqueous alkali solution and subsequently treated with acid, the improvement wherein the degumming is effected by intimately contacting the crude oil with orthophosphoric acid of about 85% concentration for about 5 to 30 minutes at a temperature between 60 and 90° C. in an evacuated zone at an absolute pressure of maximally 60 mm. Hg, whereby sludge is formed, removable by filtration.

3. Process for neutralizing acid-degummed fatty oil, comprising passing said oil up through aqueous alkaline solution in a plurality of streams, said oil being released through apertures in juxtaposition with the oil and the solution and rising up through the solution due solely to the buoyancy forces existing between the oil and the solution, said streams, while in contact with said solution and at a substantial distance below the top surface of said solution, breaking at their upper ends into droplets of 0.3 to 3 mm. in diameter, said droplets then continuing to rise through said solution to form an oil layer thereon, whereby the oil is intimately contacted with the alkali solution to neutralize fatty acids therein while concomitantly avoiding substantial saponification and emulsification.

4. A process for refining crude fatty oils which comprises:

(1) acid-degumming the crude oils, (2) neutralizing the degummed oils by bubbling the oils in the form of drops of a size in the range about 0.3 to about 3 mm. up through a vertical column of alkaline aqueous solution having throughout its height a total horizontal cross sectional area of at least 1 sq. m., the formation of said drops being effected by feeding the oil in a plurality of separate streams into the alkaline aqueous solution through separate outlets disposed uniformly over the horizontal cross sectional area of said column at the base thereof and by suppressing turbulent motion of the alkaline aqueous solution by dividing the cross sectional area of said column on at least a lower part of the height of said column into areas of a size of about 5 to about 50 sq. cm. with vertical partitions, said streams on flowing from said outlets into the alkaline aqueous solution riding in thin columns vertically up from said outlets and breaking up at their tops into said drops which ascend freely and collect into a layer of neutralized oil on top of said column, and (3) continuously withdrawing the neutralized oil from said layer thereof on top of said column.

5. A process as claimed in claim 4, in which the alkaline aqueous solution forming said column is a weak caustic soda solution of normality less than 1.5, the total horizontal cross sectional area of said column is at least 2 sq. m., the number of separate outlets through which the oil is passed is about ten thousands per sq. m. of the horizontal cross sectional area of said column, the height of said column is about 2 m., the side of said areas into which the total horizontal cross sectional area of said column is divided by vertical partitions is about 15 sq. cm., said lower part of the height of said column is at least 20 cm., and the temperature of the solution is 60 to about 90° C. and is substantially uniform throughout said column.

6. A process as claimed in claim 5, in which said separate oil streams flow out through said separate outlets solely by their buoyancy in the solution, the oil being subjected in said outlets to the hydrostatic pressure of said column at said outlets at the base of said lye column, and in which the oil feed to said outlets is at a rate of flow resulting in the formation of drops of about 1.5 mm. in diameter.

7. A process as claimed in claim 4, in which the alkaline aqueous solution forming said column is a weak caustic soda lye of a normality in the range about 0.1 to about 0.8.

8. A process as claimed in claim 7, in which the surface tension of said weak caustic soda lye is artificially lowered by a wetting agent added to the lye.

9. A process as claimed in claim 8, in which said wetting agent is a 60 percent alkylarylsulfonate detergent and is added to the lye in a small amount up to about 0.25 percent by weight of the lye.

10. A process as claimed in claim 7, in which the ionic strength of said weak caustic soda lye is artificially increased by a neutral electrolyte added to the lye.

11. A process as claimed in claim 10, in which said neutral electrolyte is common salt and is added to the lye in a small amount up to about 0.25 percent by weight of the lye.

12. A process as claimed in claim 4, in which the degumming of the crude oil prior to the neutralization thereof is carried out by passing the crude oil into a vacuum drying zone, for deaerating and vacuum drying, and contacting therewith by stirring at an elevated temperature in the range about 60 to about 90° C. and at a reduced pressure below 60 mm. of mercury up to about 1 percent by weight of the oil of orthophosphoric acid of a concentration up to about 85 percent by weight for a period of about 5 to 30 minutes, and continuously feeding the phosphoric-acid-treated oil in its vacuum-dried state without contact with air to said column of alkaline aqueous solution through filter for substantially complete removal of formed sludge in the degummed oil prior to the bubbling up of the oil through said column of alkaline aqueous solution.

13. A process as claimed in claim 12, in which the degummed and neutralized oil is withdrawn from the layer thereof on top of said column into a vacuum drying zone in which up to about 0.05 percent by weight of the oil of citric acid in aqueous solution is contacted with the oil by stirring at a reduced pressure of about 20 mm. of mercury and at a temperature in the range about 85 to about 90° C., the oil being vacuum-dried in said zone and finally filtered in its vacuum-dried state.

14. A process as claimed in claim 4, in which the neutralized oil collecting into a layer on top of said column is passed up through a wire net with 10 to about 20 meshes per inch for enhancing the rupture of any soap films on the collecting oil drops and the sinking of the ruptured soap films into said column.

References Cited by the Examiner

UNITED STATES PATENTS

| | | | |
|---|---|---|---|
| 1,111,788 | 9/1914 | Ewing | 23—285 |
| 1,387,080 | 8/1921 | Smith | 23—285 |
| 2,183,486 | 12/1939 | Colbeth | 260—425 |
| 2,678,936 | 5/1954 | Afzelius et al. | 260—425 |

CHARLES B. PARKER, *Primary Examiner.*